(12) United States Patent
Lee et al.

(10) Patent No.: US 11,949,975 B2
(45) Date of Patent: Apr. 2, 2024

(54) CAMERA MODULE AND IMAGING APPARATUS INCLUDING THE SAME

(71) Applicant: Samsung Electronics Co., Ltd., Suwon-si (KR)

(72) Inventors: Seunghak Lee, Hwaseong-si (KR); Gunwoo Ryu, Hwaseong-si (KR); Euncheol Lee, Seoul (KR); Hyunsu Jun, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/844,398

(22) Filed: Apr. 9, 2020

(65) Prior Publication Data

US 2020/0412922 A1 Dec. 31, 2020

(30) Foreign Application Priority Data

Jun. 25, 2019 (KR) .................. 10-2019-0075786

(51) Int. Cl.
*H04N 23/57* (2023.01)
*H04N 5/953* (2006.01)
(Continued)

(52) U.S. Cl.
CPC ............ *H04N 23/57* (2023.01); *H04N 5/953* (2013.01); *H04N 23/40* (2023.01); *H04N 23/55* (2023.01)

(58) Field of Classification Search
CPC .... H04N 5/2257; H04N 5/2254; H04N 5/228; H04N 5/953; G08B 13/19628;
(Continued)

(56) References Cited

U.S. PATENT DOCUMENTS 9,179,053 B2 11/2015 Takeshita et al.
2006/0187312 A1 8/2006 Labaziewicz et al.
(Continued)

FOREIGN PATENT DOCUMENTS

CN 104111714 A 10/2014
JP 2010-103628 A 5/2010
(Continued)

OTHER PUBLICATIONS

Extended European Search Report dated Nov. 18, 2020 in European Application No. 20182107.1.
(Continued)

*Primary Examiner* — Twyler L Haskins
*Assistant Examiner* — Fayez A Bhuiyan
(74) *Attorney, Agent, or Firm* — Harness, Dickey & Pierce, P.L.C.

(57) ABSTRACT

Provided are a camera module and an imaging apparatus including the same. The camera module includes a printed circuit board (PCB); a first imaging device on the PCB, the first imaging device configured to generate first image data based on a received optical signal; a second imaging device on the PCB, the second imaging device configured to generate second image data based on the received optical signal; a power management integrated circuit (PMIC) on the PCB, the PMIC configured to generate a plurality of power voltages based on an external power voltage received from an external power supply and provide the plurality of power voltages to the first imaging device and the second imaging device; and a connector configured to receive the external power voltage from the external power supply and provide the external power voltage to the PMIC.

16 Claims, 29 Drawing Sheets

(51) Int. Cl.
*H04N 23/40* (2023.01)
*H04N 23/55* (2023.01)

(58) Field of Classification Search
CPC ............... G08B 5/38; G08B 13/19619; G08B 13/1966; G08B 13/19663; G08B 13/19684; G08B 13/19695; H04R 1/025; H04R 1/08
See application file for complete search history.

(56) References Cited

U.S. PATENT DOCUMENTS

| | | | | |
|---|---|---|---|---|
| 2014/0312990 | A1* | 10/2014 | Lee | H03H 1/0007 333/181 |
| 2015/0172543 | A1* | 6/2015 | Laroia | H04N 5/23232 348/262 |
| 2016/0365058 | A1 | 12/2016 | Nam et al. | |
| 2017/0358241 | A1* | 12/2017 | Wexler | G06V 40/10 |
| 2019/0058814 | A1* | 2/2019 | Jung | H05K 9/0049 |
| 2019/0082110 | A1* | 3/2019 | Jin | G06T 7/70 |
| 2020/0275031 | A1 | 8/2020 | Park | |

FOREIGN PATENT DOCUMENTS

| | | |
|---|---|---|
| JP | 2015-018000 A | 1/2015 |
| KR | 10-0604547 | 7/2006 |
| KR | 10-0651920 | 12/2006 |
| KR | 10-0790116 | 1/2008 |
| KR | 10-1256304 | 4/2013 |
| KR | 10-2018-0051340 A | 5/2018 |
| WO | WO-2019/050200 A1 | 3/2019 |
| WO | WO-2019-050361 A1 | 3/2019 |

OTHER PUBLICATIONS

Examination dated Dec. 23, 2022 in European Application No. 20182107.1.
Office Action dated Dec. 11, 2023 in Chinese Application No. 202010353999.3.

* cited by examiner

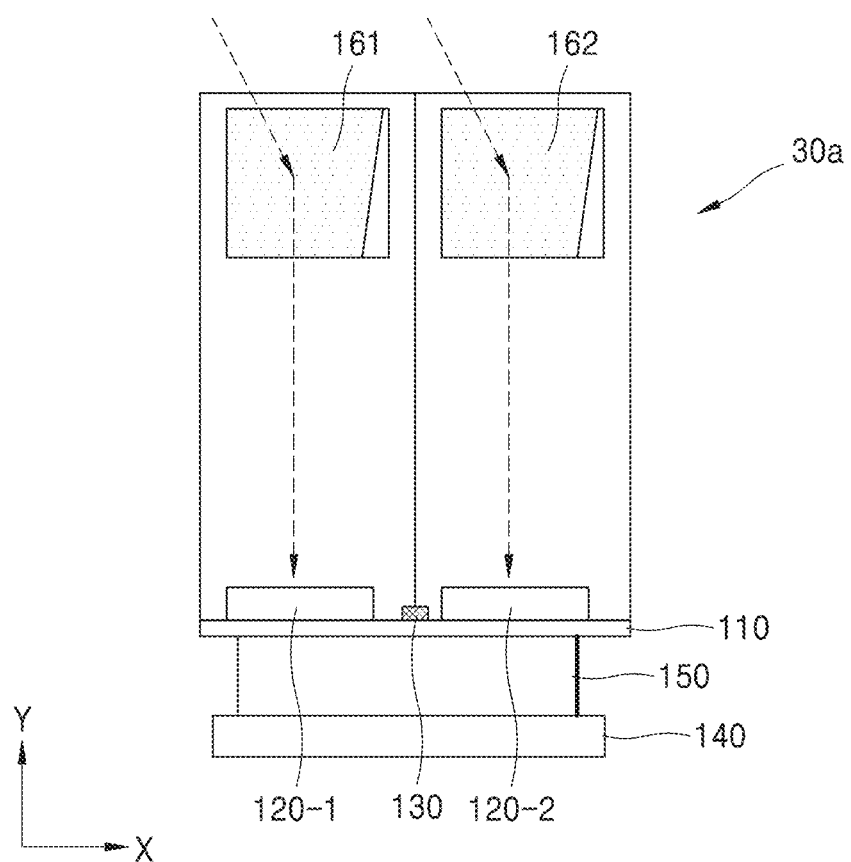

CAMERA MODULE AND IMAGING APPARATUS INCLUDING THE SAME

CROSS-REFERENCE TO RELATED APPLICATION

This application claims the benefit of Korean Patent Application No. 10-2019-0075786, filed on Jun. 25, 2019, in the Korean Intellectual Property Office, the disclosure of which is incorporated herein in its entirety by reference.

BACKGROUND

The inventive concepts relate to a camera module and/or an imaging apparatus comprising the same.

Recently, due to the expanded use of camera functions in electronic devices such as smart phones, a plurality of camera assemblies, each including image sensors, are often installed in the electronic devices. The electronic devices may generate a 3D image, a panoramic image, a zoom image, and a high-resolution image by synthesizing a plurality of images captured by the plurality of camera assemblies. In order to provide a high quality image, a technique of minimizing or reducing the noise generation of an image sensor is required.

SUMMARY

The inventive concepts provide a camera module for minimizing or reducing noise of an image sensor and/or minimizing or reducing the number of elements to be mounted; and/or an imaging apparatus including the same are provided.

According to an example aspect of the inventive concepts, there is provided a camera module including a printed circuit board (PCB); a first imaging device on the PCB and configured to generate first image data based on a received optical signal; a second imaging device on the PCB and configured to generate second image data based on the received optical signal; a power management integrated circuit (PMIC) on the PCB and configured to generate a plurality of power voltages based on an external power voltage received from an external power supply, the plurality of power voltages including a first power voltage and a second power voltage. The PMIC configured to provide the at least the first power voltage to the first imaging device and at least the second power voltage the second imaging device; and a connector configured to receive the external power voltage from the external power supply and provide the external power voltage to the PMIC.

According to an example embodiment of the inventive concepts, there is provided a camera module including a first imaging device mounted on a first printed circuit board, the first imaging device configured to generate first image signals based on a received optical signal; a second imaging device configured to generate second image signals based on the optical signal; a first refracting device configured to refract the received optical signal toward the first imaging device; a PMIC on the first PCB and configured to provide a first power voltage to the first imaging device; and a connector configured to receive a power voltage from an outside and provide the power voltage to the PMIC.

According to an example embodiment of the inventive concepts, there is provided an imaging apparatus including: a first camera module comprising at least one first camera assembly and a first PMIC, the at least one first camera assembly configured to generate image data, and the first PMIC configured to generate a plurality of power voltages based on a power voltage received through a connector to provide the plurality of power voltages to the at least one first camera assembly; a power supply configured to provide the power voltage to the first camera module through the connector; and a processor configured to provide a control signal to the first camera module through the connector.

BRIEF DESCRIPTION OF THE DRAWINGS

Some embodiments of the inventive concepts will be more clearly understood from the following detailed description taken in conjunction with the accompanying drawings in which:

FIGS. 16A and 16B schematically illustrate a camera module according to an example embodiment of the inventive concepts.

DETAILED DESCRIPTION OF THE EMBODIMENTS

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to" another element there are no intervening elements present.

Figure 1:
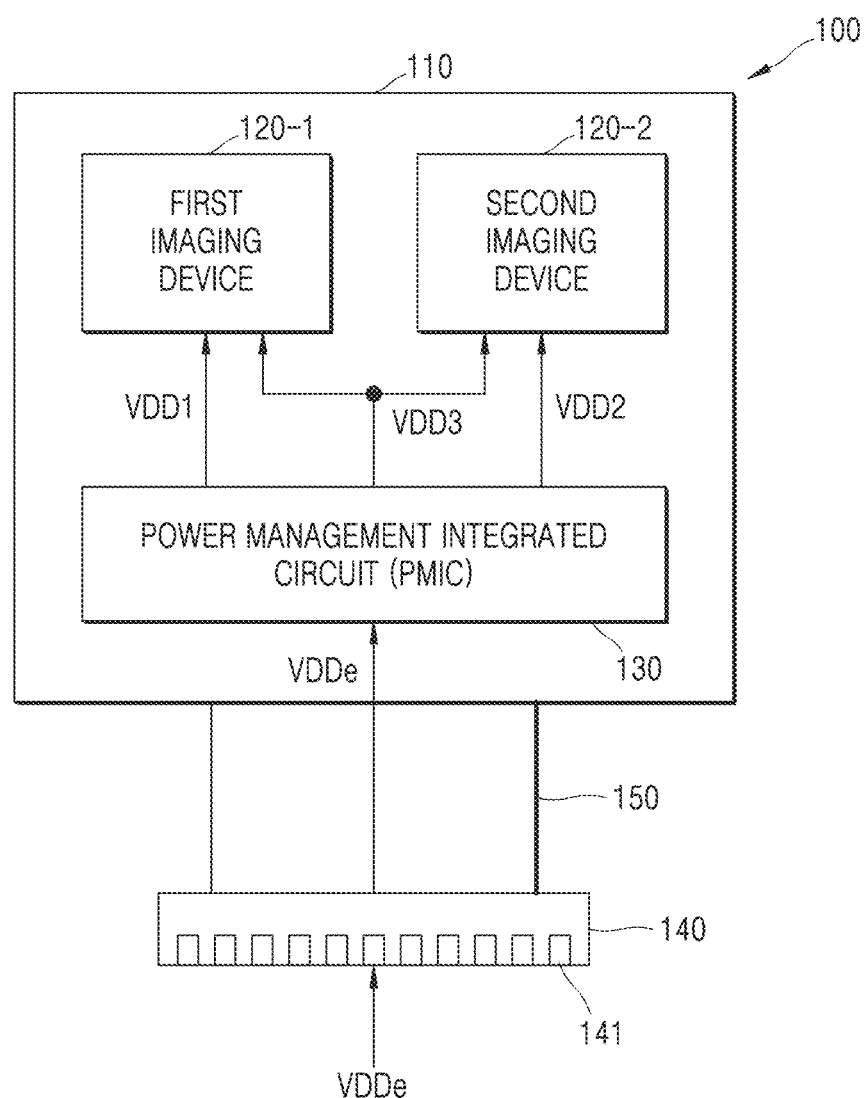
FIG. 1 is a block diagram illustrating a camera module according to an example embodiment of the inventive concepts.

FIG. 1 is a block diagram illustrating a camera module 100 according to an example embodiment of the inventive concepts.

Referring to FIG. 1, the camera module 100 may include a first imaging device 120-1, a second imaging device 120-2, a power management integrated circuit (PMIC) 130, and a connector 140. The first imaging device 120-1, the second imaging device 120-2, and the PMIC 130 may be on a printed circuit board (PCB) 110. In FIG. 1, the camera module 100 is illustrated as including two imaging devices, the first imaging device 120-1 and the second imaging device 120-2, but is not limited thereto. For example, the camera module 100 may include three or more imaging devices. As such, the camera module 100 having a plurality of imaging devices and may be referred to as a multi-camera module.

The imaging device may be a camera assembly including a lens and an image sensor. Each of the first imaging device 120-1 and the second imaging device 120-2 may include a lens and an image sensor, and the image sensor may generate (or obtain) an image (or image data) based on an optical signal collected through their respective lens.

A first image generated by the first imaging device 120-1 may have different image characteristics from a second image generated by the second imaging device 120-2. For example, the first imaging device 120-1 may generate a black and white image, and the second imaging device 120-2 may generate a color image. As another example, the first imaging device 120-1 may generate an image using a lens having a first angle of view, and the second imaging device 120-2 may generate an image using a lens having a second angle of view that is wider than the first angle of view. Therefore, the second image generated by the second imaging device 120-2 may have a wider angle of view than the first image generated by the first imaging device 120-1. However, the embodiments are not limited thereto, and, for example, the lenses of the first imaging device 120-1 and the second imaging device 120-2 may have the same angle of view, and the angles of view of the first image and the second image may be the same. Other alternatives of the first imaging device 120-1 and the second imaging device 120-2 may have shared or varied characteristics like focal length, lens angle, etc. without diverging from the example embodiments.

The PMIC 130 may generate a plurality of power voltages VDD1, VDD2, and VDD3 used in the first imaging device 120-1 and the second imaging device 120-2 based on an external power voltage VDDe received from the outside through the connector 140 and provide the power voltages VDD1, VDD2, and VDD3 to the first imaging device 120-1 and the second imaging device 120-2.

In this case, the first power voltage VDD1 means at least one voltage provided to the first imaging device 120-1, the second power voltage VDD2 means at least one voltage provided to the second imaging device 120-2, and the third power voltage VDD3 means at least one voltage commonly provided to the first imaging device 120-1 and the second imaging device 120-2. Some of the plurality of power voltages VDD1, VDD2, and VDD3 may be analog power voltages provided to analog circuits, and the others may be digital power voltages provided to digital circuits.

In an embodiment, the PMIC 130 may receive a feedback signal from at least one of the first imaging device 120-1 and the second imaging device 120-2 and may adjust the voltage level of a power voltage VDD1, VDD2, and VDD3 provided to the corresponding imaging device based on the feedback signal. For example, when the voltage level of the received first power voltage VDD1 is lower or higher than a target level, the first imaging device 120-1 may transmit a feedback signal informing this to the PMIC 130. Accordingly, the PMIC 130 may adjust the first power voltage VDD1 to match the target level.

The connector 140 may electrically connect the camera module 100 to a main board of an electronic device including the camera module 100. The connector 140 may be electrically connected to the PCB 110. In an embodiment, as shown in FIG. 1, the connector 140 may be connected to the PCB 110 through a FPCB (FPCB) 150. However, connector is not limited thereto. For example, in another embodiment, the connector 140 may be directly connected to PCB 110.

The connector 140 may include a plurality of pins 141 that transmit and receive signals or voltages. The connector 140 may receive the external power voltage VDDe through some of the plurality of pins 141, and the connector 140 may provide the external power voltage VDDe to the PMIC 130 through wiring lines patterned on the PCB 110 and the FPCB 150. Control signals for controlling the camera module 100 may be received through the other pins of the plurality of pins 141.

Wiring lines for communicating signals between the first imaging device 120-1, the second imaging device 120-2, the PMIC 130, and the connector 140 may also be patterned on the PCB 110.

In an example embodiment, the camera module 100 may further include a heat dissipation member (not shown) for dissipating heat generated by the first imaging device 120-1, the second imaging device 120-2, and the PMIC 130. For example, the heat dissipation member may be attached to one surface of the PCB 110, for example, a surface opposite to a surface on which the first imaging device 120-1, the second imaging device 120-2, and the PMIC 130 are mounted. The camera module 100 may also include a connection member for grounding the PCB 110 with a main frame of the electronic device including the camera module 100.

The camera module 100 may be part of an electronic device having an image capturing or light sensing function. For example, the camera module 100 may be part of an electronic device such as a digital still camera, a digital video camera, a smartphone, a wearable device, an Internet of Things (IoT) device, a tablet personal computer (PC), a personal digital assistant (PDA), a portable multimedia player (PMP), a navigation device, etc. In addition, the camera module 100 may be part of an electronic device provided as a component of a larger system or device like a vehicle, furniture, manufacturing facilities, doors, various measurement devices, a security system, etc.

Figure 2:
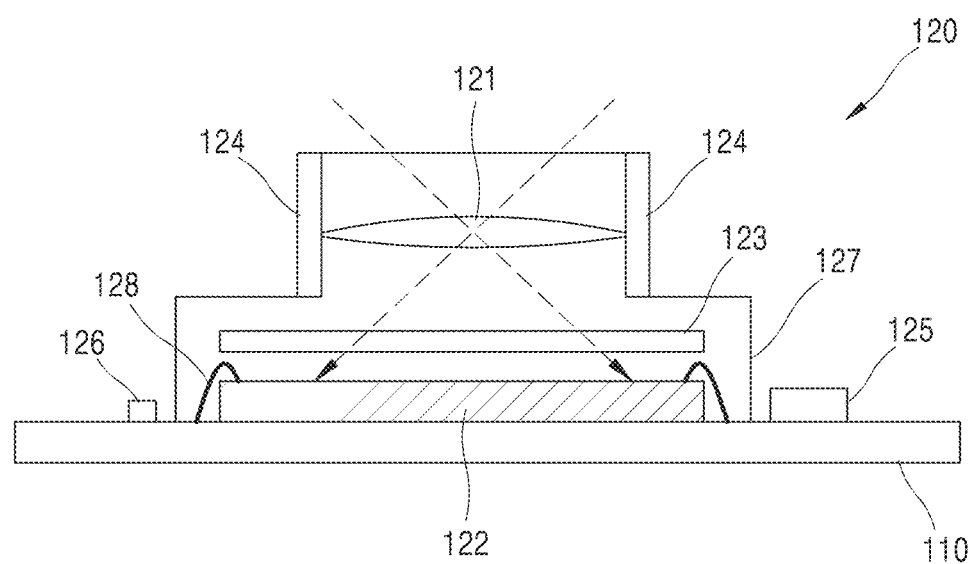
FIG. 2 is a side cross-sectional view schematically showing an imaging device.

FIG. 2 is a side cross-sectional view schematically showing an imaging device 120. The imaging device 120 of FIG. 2 may be applied to at least one of the first imaging device 120-1 and the second imaging device 120-2 of FIG. 1.

Referring to FIG. 2, the imaging device 120 may include a lens 121, an image sensor 122, a filter 123, an actuator 124, a driving circuit 125, a passive element 126, and a housing 127. In an example embodiment, the imaging device 120 may include a plurality of lenses and may further include components for providing additional functions like an adjustable focal length, variable aperture, focusing, etc.

Among optical signals collected through the lens 121, an optical signal transmitted through the filter 123 may be directed to the image sensor 122. The filter 123 may block a component of a specific wavelength band among frequency components of the received optical signal. As an example, the filter 123 is an IR cut filter, and may block an infrared component of the optical signal. Accordingly, filter 123 may prevent, reduce, or minimize the noise in the image data caused by the infrared component. However, the example embodiment is not limited thereto, and the filter 123 may block a component of a wavelength band corresponding to a different color or range among the frequency components of the received optical signal.

The image sensor 122 may convert the received optical signal into an electrical signal. The image sensor 122 may convert the optical signal to an electrical signal to generate an electronic image or image data. The conversion may be an analog-to-digital conversion.

The image sensor 122 may include a pixel array that receives an optical signal. The pixel array may be implemented as, for example, a photoelectric conversion element such as a charge coupled device (CCD) or a complementary metal oxide semiconductor (CMOS), or may be implemented as various types of photoelectric conversion elements. The pixel array may include a plurality of pixels for converting a received optical signal into an electrical signal, and the plurality of pixels may be arranged in a matrix. Each of the plurality of pixels includes a photosensitive element. For example, the photosensitive element may include a photodiode, a phototransistor, a port gate, a pinned photodiode, or the like.

The image sensor 122 may be mounted on the PCB 110. In an example embodiment, the image sensor 122 may be mounted on the PCB 110 by a wire bonding method using a wire 128.

The actuator 124 may be connected to the lens 121 and may move the lens 121 in an optical axis or a plane perpendicular to the optical axis under the control of the driving circuit 125. Accordingly, the imaging device 120 may provide an additional function for improving image quality such as auto focusing (AF), optical image stabilizer (OIS), iris aperture, etc. In an embodiment, the actuator 124 may be integrated with the housing 127 that forms the exterior of the imaging device 120. When the imaging device 120 does not provide the additional function, the imaging device 120 may not include the driving circuit 125 and the actuator 124.

The image sensor 122, the actuator 124, and the driving circuit 125 may operate based on a power voltage received from the PMIC (130 of FIG. 1), and may include the passive element 126 for noise removal of the received voltage and voltage level stabilization. For example, the passive element 126 may be a capacitor.

In FIG. 2, the drive circuit 125 and the passive element 126 are outside the housing 127, but are not limited thereto. For example, and the drive circuit 125 and/or the passive element 126 may be inside the housing 127 or integrated into the housing 127.

Figure 3A:
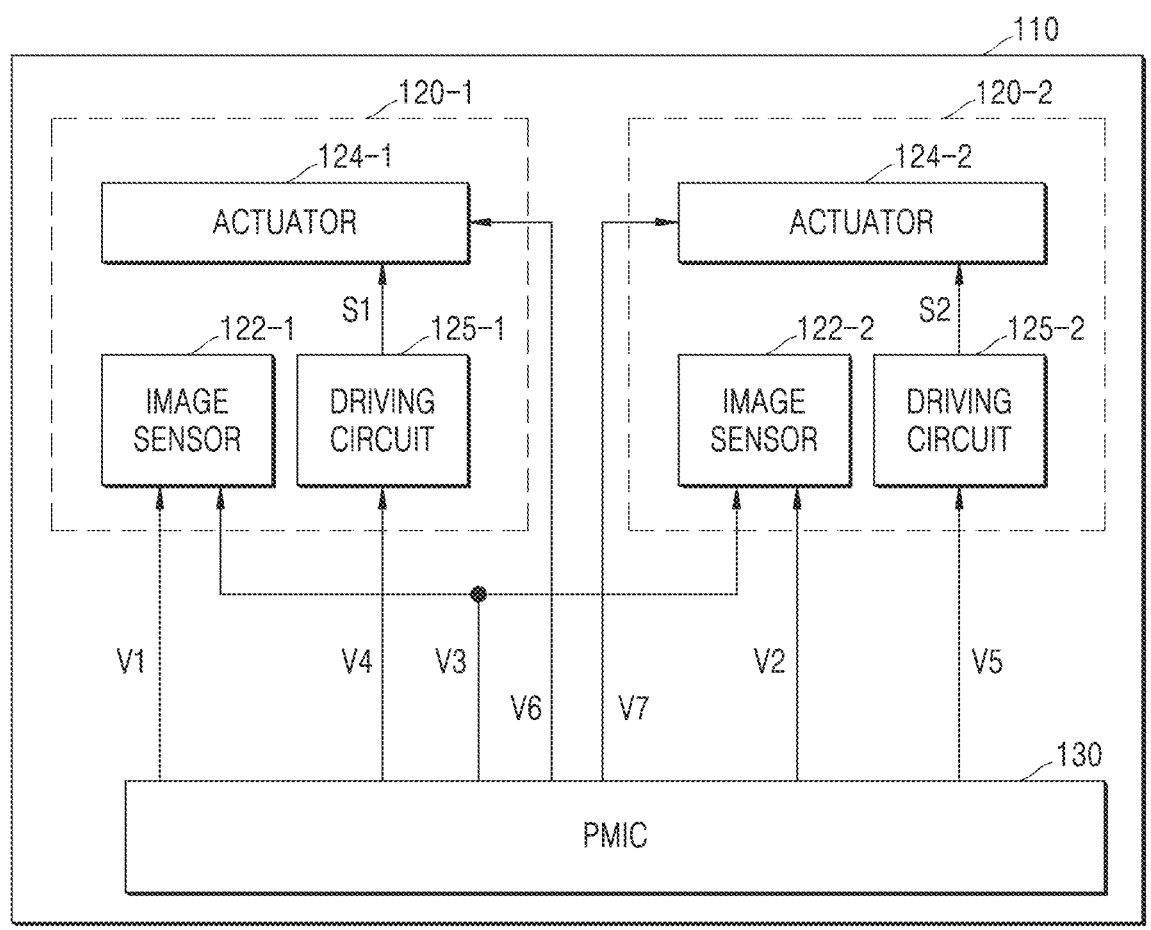
FIGS. 3A to 3C illustrate examples of imaging devices included in a camera module and examples of voltages provided by a PMIC to the imaging devices according to an example embodiment of the inventive concepts.
Figure 3B:
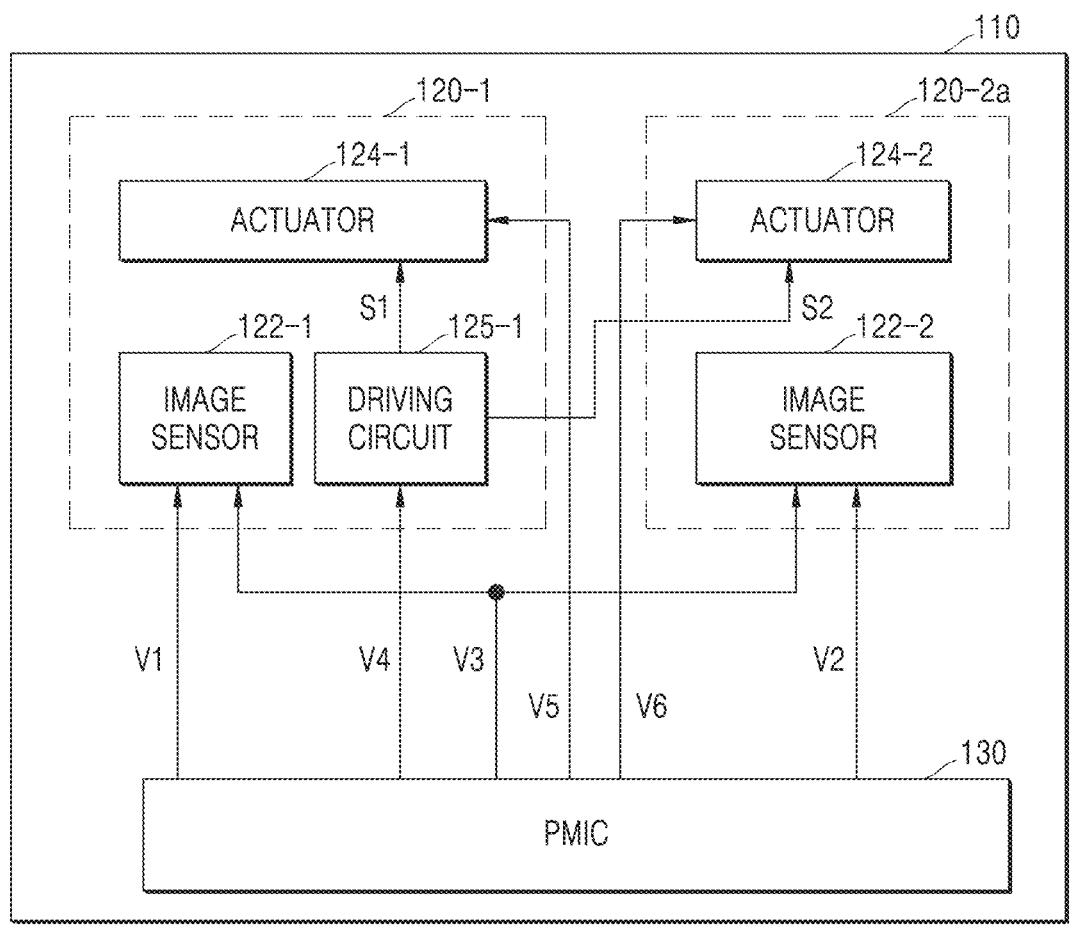
Figure 3C:
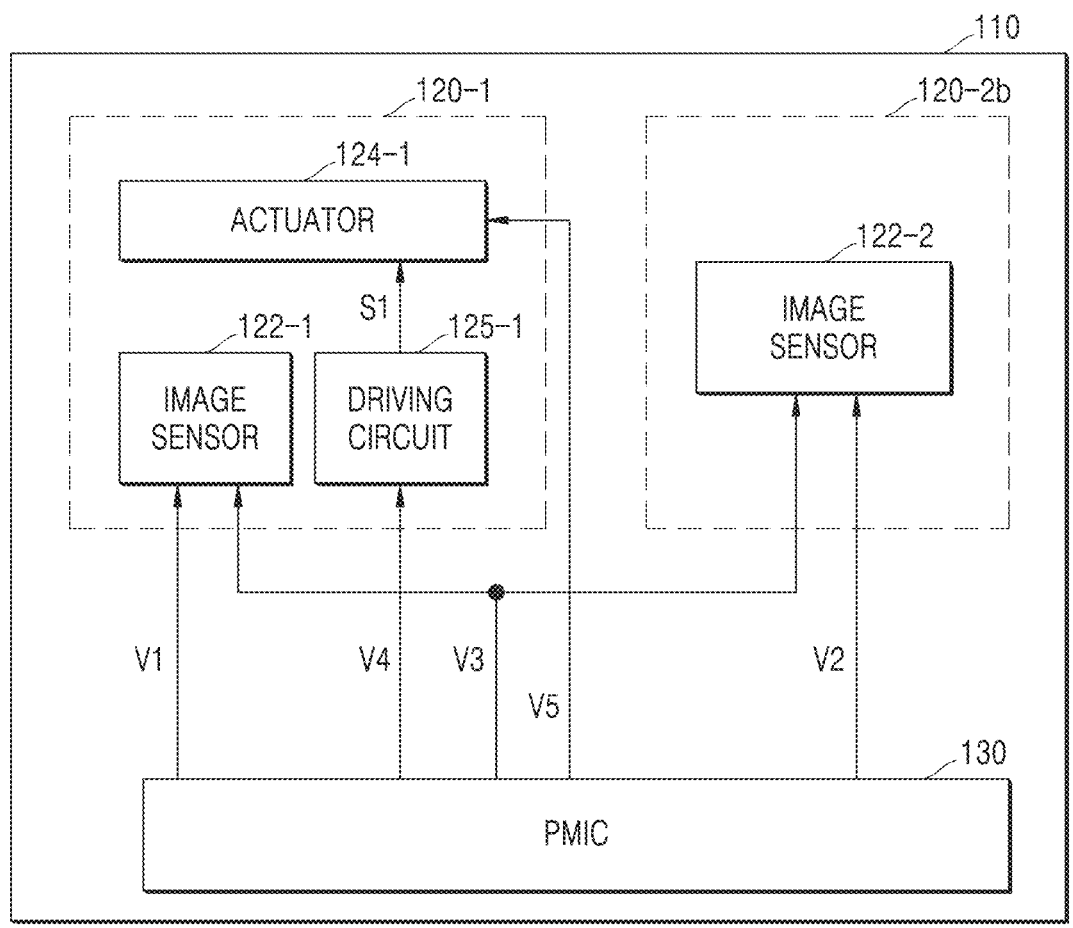

FIGS. 3A to 3C illustrate implementation examples of imaging devices included in a camera module and examples of voltages provided by the PMIC 130 to the imaging devices according to an example embodiment. FIGS. 3A to 3C illustrate components that operate based on a received voltage among components included in the imaging devices.

Referring to FIG. 3A, the first imaging device 120-1 may include an image sensor 122-1, an actuator 124-1, and a driving circuit 125-1, and the second imaging device 120-2 may also include the image sensor 122-2, an actuator 124-2, and a driving circuit 125-2.

The PMIC 130 may generate a plurality of power voltages V1 to V7 used in the first imaging device 120-1 and the second imaging device 120-2 for example, first to seventh voltages V1 to V7, and provide the plurality of power voltages V1 to V7 to the first imaging device 120-1 and the second imaging device 120-2. For example, the PMIC 130 may generate the first voltage V1, the fourth voltage V4, and the sixth voltage V6 as the first power voltage (VDD1 of FIG. 1) provided to the first imaging device 120-1, generate the second voltage V2, the fifth voltage V5, and the seventh voltage V7 as the second power voltage (VDD2 of FIG. 1) provided to the second imaging device 120-2, and generate the third voltage V3 as the third power voltage (VDD3 in FIG. 1) commonly provided to the first imaging device 120-1 and the second imaging device 120-2. However, this is merely an example, and the type and number of voltages generated by the PMIC 130 may vary.

The PMIC 130 may output the plurality of power voltages V1 to V7, and plurality of power voltages V1 to V7 may be provided to corresponding components among the components of the first imaging device 120-1 and the second imaging device 120-2 respectively through wirings patterned on the PCB 110.

In the first imaging device 120-1, the image sensor 122-1 may use the first voltage V1 and the third voltage V3 as the power voltages, the driving circuit 125-1 may use the fourth voltage V4 as the power voltage, and the actuator 124-1 may use the sixth voltage V6 as the power voltage. The actuator 124-1 may operate under the control of the driving circuit 125-1, for example, based on a first control signal S1.

In the second imaging device 120-2, the image sensor 122-2 may use the second voltage V2 and the third voltage V3 as the power voltages, the driving circuit 125-2 may use the fifth voltage V5 as the power voltage, and the actuator 124-2 may use the seventh voltage V7 as the power voltage. The actuator 124-2 may operate under the control of the driving circuit 125-2, for example, based on a second control signal S2.

Referring to FIG. 3B, the first imaging device 120-1 may include the image sensor 122-1, the actuator 124-1, and the driving circuit 125-1, and a second imaging device 120-2a may include the image sensor 122-2 and the actuator 124-2.

Compared with the second imaging device 120-2 of FIG. 3A, the second imaging device 120-2a does not include a driving circuit, and the actuator 124-2 of the second imaging device 120-2a may operate under the control of the driving circuit 125-1 provided in the first imaging device 120-1. The actuator 124-2 of the second imaging device 120-2a may operate based on the second control signal S2 provided from the driving circuit 125-1.

Referring to FIG. 3C, the first imaging device 120-1 may include the image sensor 122-1, the actuator 124-1, and the driving circuit 125-1, and a second imaging device 120-2*b* may include the image sensor 122-2.

Compared to the second imaging device 120-2 of FIG. 3A, the second imaging device 120-2*b* may not include a driving circuit and an actuator.

In FIGS. 3B to 3C, the PMIC 130 may generate voltages according to components included in the first imaging device 120-1 and the second imaging devices (120-2*a* of FIG. 3B and 120-2*b* of FIG. 3C) and provide the voltages to each of the components of the first imaging device 120-1 and the second imaging devices (120-2*a* of FIG. 3B and 120-2*b* of FIG. 3C). For example, in FIG. 3B, the PMIC 130 may generate the first to sixth voltages V1 to V6 used in the first imaging device 120-1 and the second imaging device 120-2*a* and provide the first to sixth voltages V1 to V6 to each of corresponding components of the first imaging device 120-1 and the second imaging device 120-2*a*. In addition, in FIG. 3C, the PMIC 130 may generate the first to fifth voltages V1 to V5 used in the first imaging device 120-1 and the second imaging device 120-2*b* and provide the first to fifth voltages V1 to V5 to each of the corresponding components of the first imaging device 120-1 and the second imaging device 120-2*b*.

Figure 4:
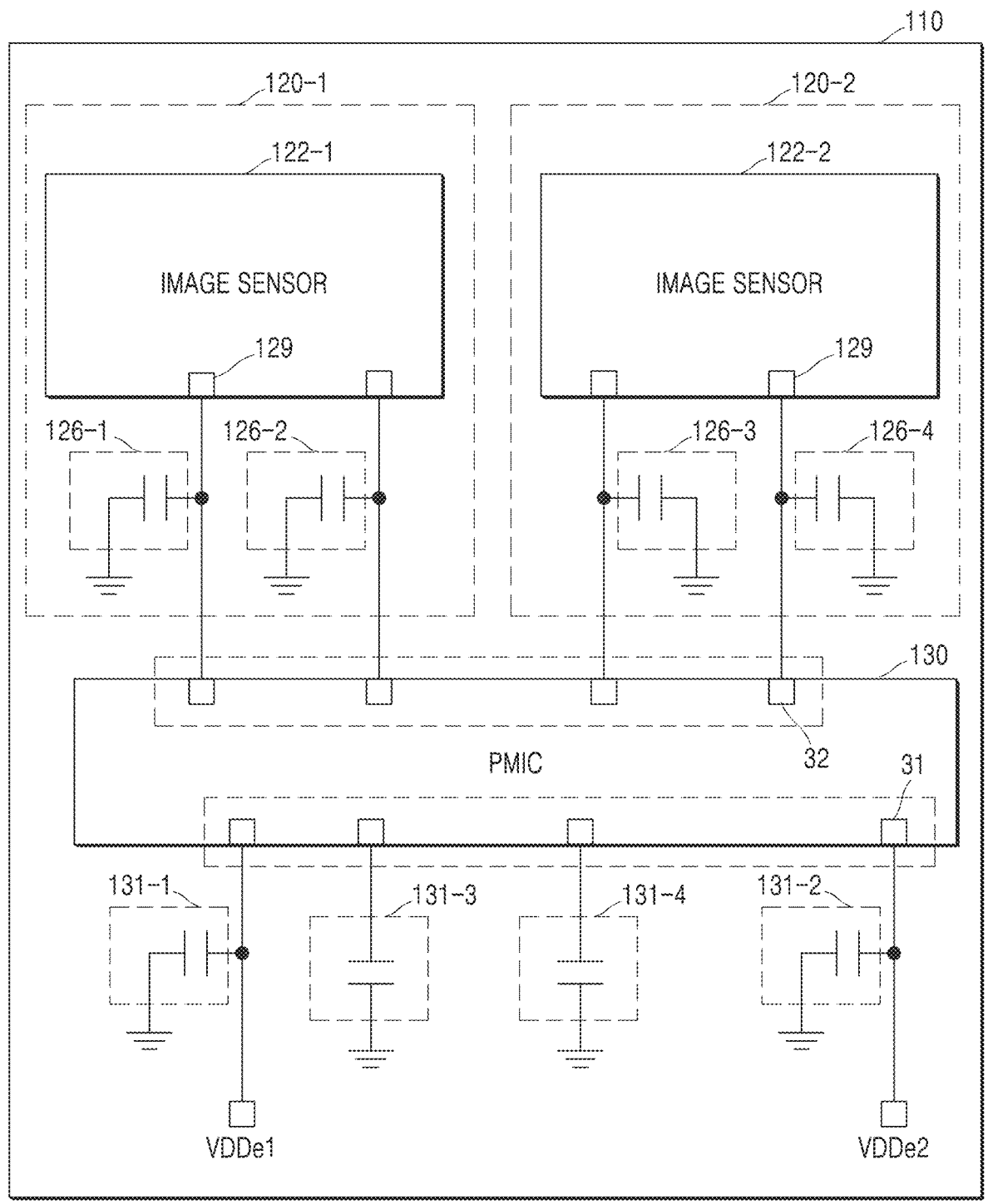
FIG. 4 schematically illustrates a camera module according to an example embodiment of the inventive concepts.

FIG. 4 schematically illustrates the camera module 100 according to an example embodiment of the inventive concepts.

Referring to FIG. 4, the PMIC 130 may include a plurality of input terminals 31, and receive external power, for example, from the first external power voltage VDDe1 and the second external power voltage VDDe2, through some terminals of the plurality of input terminals 31. Passive elements 131-1 to 131-4 may be connected to the plurality of input terminals 31 to remove noise from the received power voltages, or internally generate voltages and stabilize voltage levels. The passive elements 131-1 to 131-4 may be, for example, capacitors.

The PMIC 130 may include a plurality of output terminals 32 and may output power voltages to the first imaging device 120-1 and to the second imaging device 120-2 through the plurality of output terminals 32.

As described above with reference to FIG. 2, the first imaging device 120-1 and/or the second imaging device 120-2 may include passive elements 126-1 to 126-4. For example, as shown in FIG. 4, the passive elements 126-1 through 126-4 may be connected to input terminals 129 of the image sensors 122-1 and 122-2.

At least some of the plurality of output terminals 32 of the PMIC 130 may be connected to the passive elements 126-1 to 126-4. The PMIC 130 may share the passive elements 126-1 through 126-4 with the first imaging device 120-1 and/or the second imaging device 120-2. The PMIC 130 may use the passive elements 126-1 to 126-4 of the first imaging device 120-1 and/or the second imaging device 120-2 to remove noise of power voltages output and to stabilize voltage levels. As such, separate passive elements for removing noise from power voltages output to the plurality of output terminals 32 of the PMIC 130 and stabilizing voltage levels may be omitted, and the PMIC 130 may remove noise of the power voltages output by using the passive elements 126-1 to 126-4 of the first imaging device 120-1 and/or the second imaging device 120-2 and stabilize voltage levels. Therefore, the number of passive elements included in the camera module 100 may be reduced.

Figure 5A:
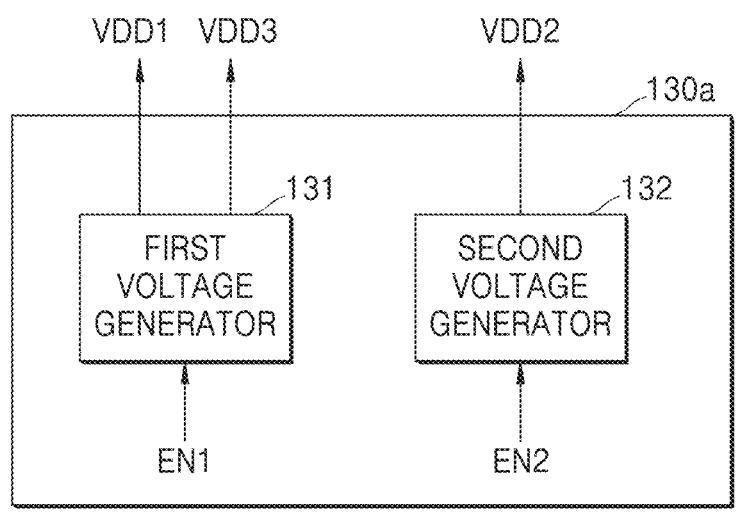
FIGS. 5A and 5B are block diagrams schematically illustrating PMICs according to an example embodiment of the inventive concepts.
Figure 5B:
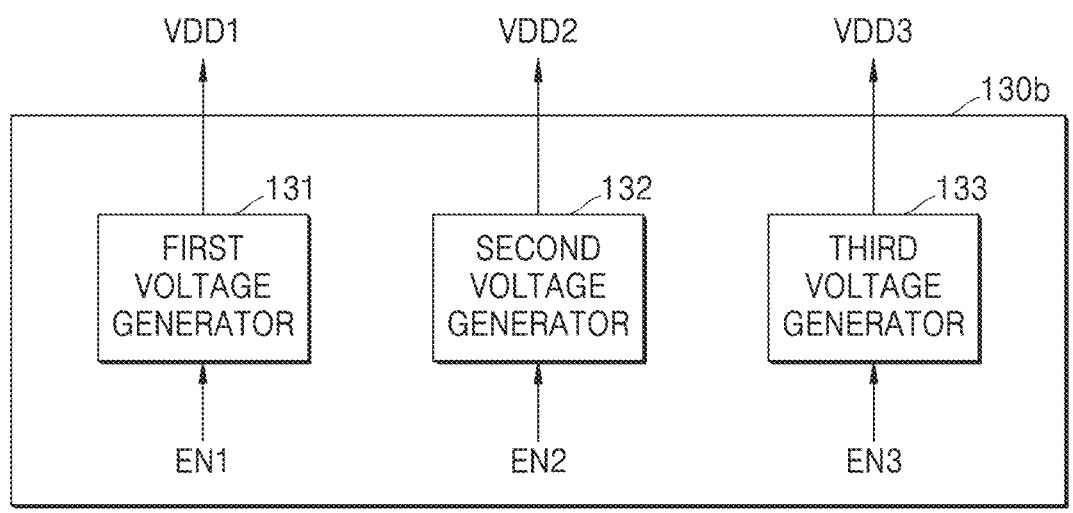

FIGS. 5A and 5B are block diagrams schematically illustrating PMICs 130*a* and 130*b* according to an example embodiment of the inventive concepts.

Referring to FIG. 5A, the PMIC 130*a* may include a first voltage generator 131 and a second voltage generator 132. The first voltage generator 131 may generate the first power voltage VDD1 provided to the first imaging device (120-1 of FIG. 1) and the third power voltage VDD3 commonly provided to the first imaging device 120-1 and the second imaging device (120-2 of FIG. 1), and the second voltage generator 132 may generate the second power voltage VDD2 provided to the second imaging device 120-2.

The PMIC 130*a* may receive a control signal from an external processor (e.g., 200 of FIG. 7) and may receive a first enable signal EN1 and a second enable signal EN2.

The first voltage generator 131 may activate or deactivate in response to the first enable signal EN1, and the second voltage generator 132 may activate or deactivate in response to the second enable signal EN2. For example, the first voltage generator 131 and the second voltage generator 132 may be activated in response to the first enable signal EN1 and the second enable signal EN2 of a first level, for example, logic high, respectively and deactivated in response to the first enable signal EN1 and the second enable signal EN2 of a second level, for example, logic low, respectively.

For example, when both of the first imaging device 120-1 and the second imaging device 120-2 operate, the PMIC 130*a* may receive the first enable signal EN1 and the second enable signal EN2 of a first logic level and when the first imaging device 120-1 operates and the second imaging device 120-2 does not operate, the PMIC 130*a* may receive the first enable signal EN1 of the first logic level and the second enable signal EN2 of a second logic level.

Referring to FIG. 5B, the PMIC 130*b* may include the first voltage generator 131, the second voltage generator 132, and a third voltage generator 133. The first voltage generator 131 may generate the first power voltage VDD1 provided to the first imaging device (120-1 of FIG. 1), the second voltage generator 132 may generate the second power voltage VDD2 provided to the second imaging device (120-2 of FIG. 1), and the third voltage generator 133 may generate the third power voltage VDD3 commonly provided to the first imaging device 120-1 and the second imaging device 120-2. The first voltage generator 131, the second voltage generator 132, and the third voltage generator 133 may activate or deactivate in response to the first enable signal EN1, the second enable signal EN2, and a third enable signal EN3, respectively.

FIGS. 6A through 6D are diagrams schematically illustrating a layout of the camera module 100 according to an example embodiment of the inventive concepts. A position where the PMIC 130 is on the layout of the camera module 100 will be described with reference to FIGS. 6A through 6D.

Figure 6A:
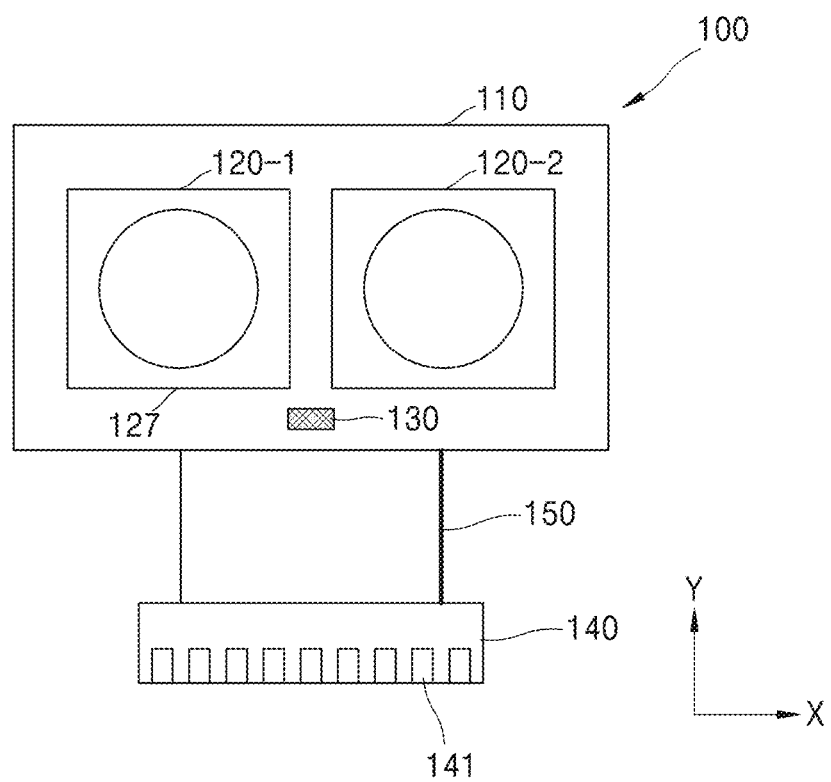
FIGS. 6A through 6D are diagrams schematically illustrating a layout of a camera module according to an example embodiment of the inventive concepts.

Referring to FIG. 6A, the first imaging device 120-1 and the second imaging device 120-2 may be arranged parallel to a first direction (X-axis direction) on the PCB 110, and the PMIC 130 may be between the connector 140 and the first imaging device 120-1 and the second imaging device 120-2 in a second direction (Y-axis direction) perpendicular to the first direction. In example an embodiment, the PMIC 130 may be between the first imaging device 120-1 and the second imaging device 120-2 in the first direction.

Figure 6B:
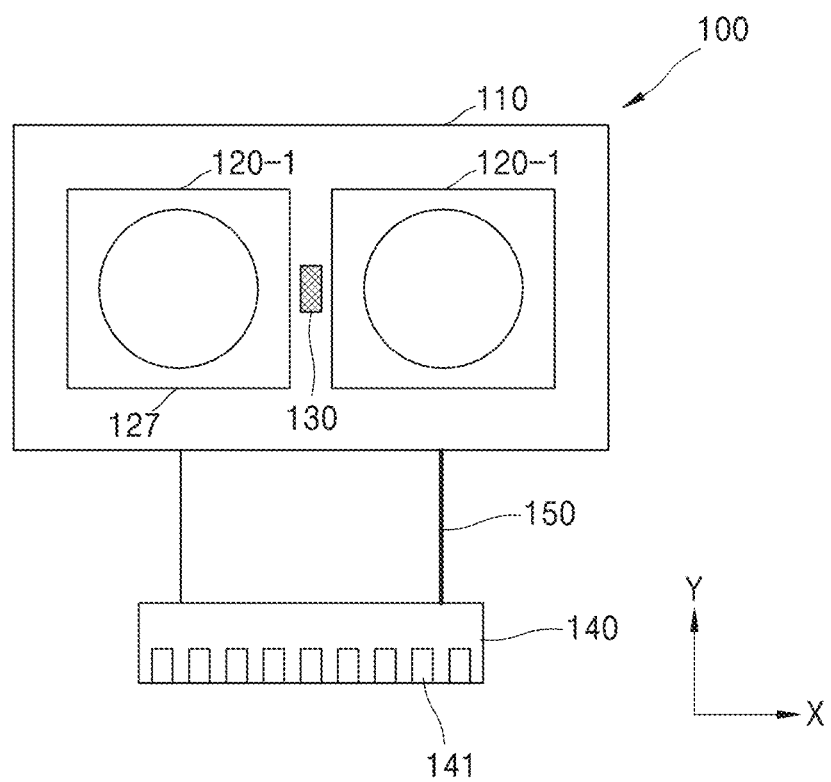

As illustrated in FIG. 6B, the PMIC 130 may be between the first imaging device 120-1 and the second imaging device 120-2.

As shown in FIGS. 6A and 6B, the PMIC 130, the connector 140, and the first and second imagining devices 120-1 and 120-2 may be arranged such that the distance between the connector 140 and the PMIC 130, and the distance between the first and second imaging devices 120-1 and 120-2 and the PMIC 130 may be minimized or reduced.

Figure 6C:
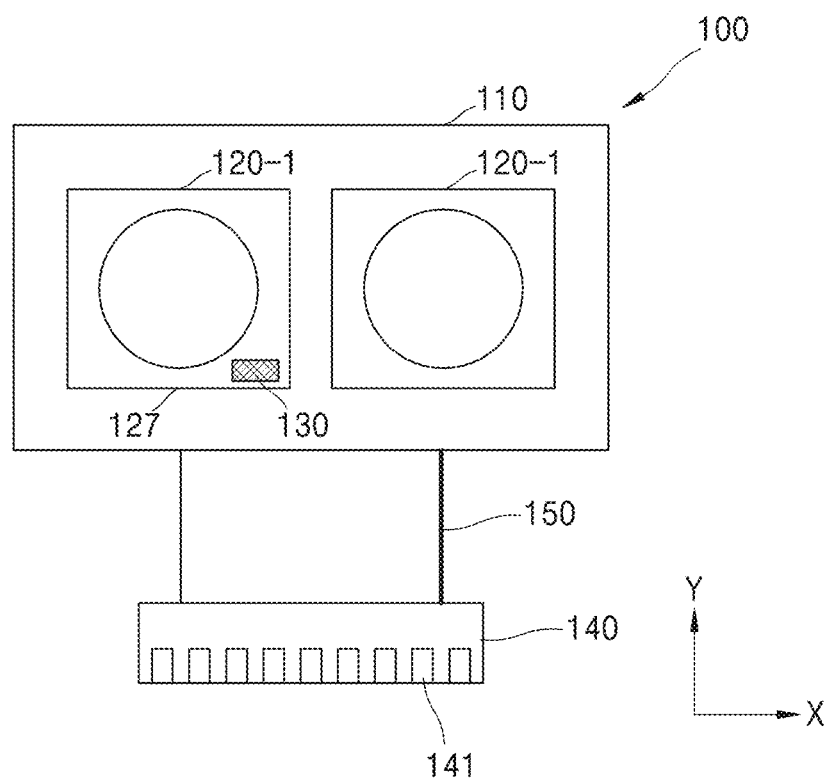

Referring to FIG. 6C, the PMIC 130 may be in the housing 127 of the first imaging device 120-1 or the second imaging device 120-2. For example, as shown, the PMIC 130 may be in the housing 127 of the first imaging device 120-1. In an embodiment, the PMIC 130 may be adjacent to the first imaging device 120-1. In another embodiment, the PMIC 130 may be inside the housing 127 of an imaging device sharing space with the first imaging device 120-1 and the second imaging device 120-2.

Figure 6D:
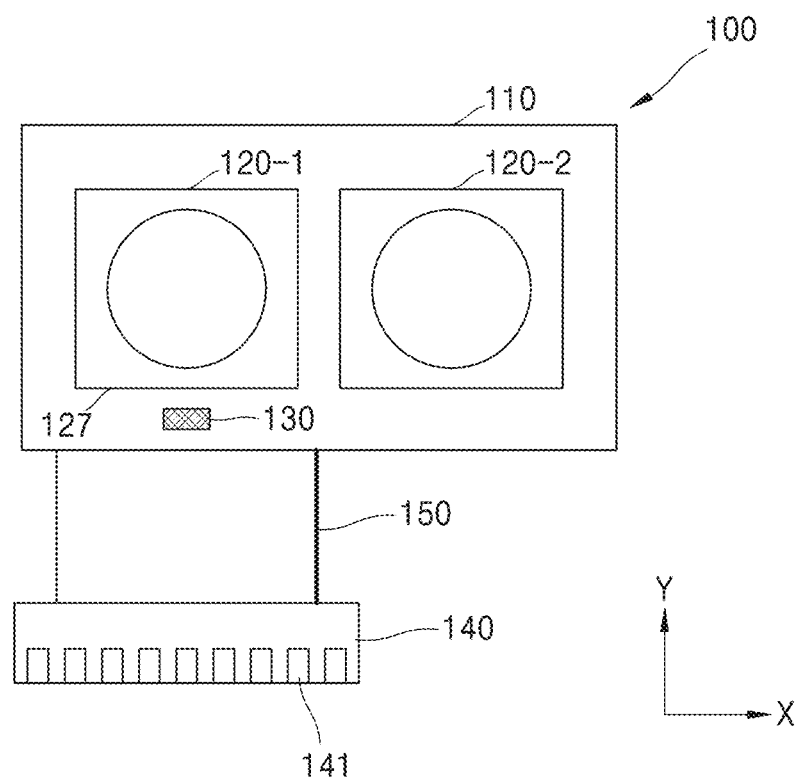

Referring to FIG. 6D, the connector 140 and the FPCB 150 may be connected to one side of the PCB 110. The PMIC 130 may also be on one side of the PCB 110, for example, the side closest to the connector 140 in order to minimize or reduce the distance between the PMIC 130 and the connector 140.

Referring to FIGS. 6A to 6D, the position where the PMIC 130 is on the layout of the camera module 100 according to examples embodiment is described above. However, the embodiments are not limited thereto, and the position where the PMIC 130 is located on the camera module 100 may be changed based on considerations like wiring efficiency, manufacturing restrictions, etc.

Figure 7:
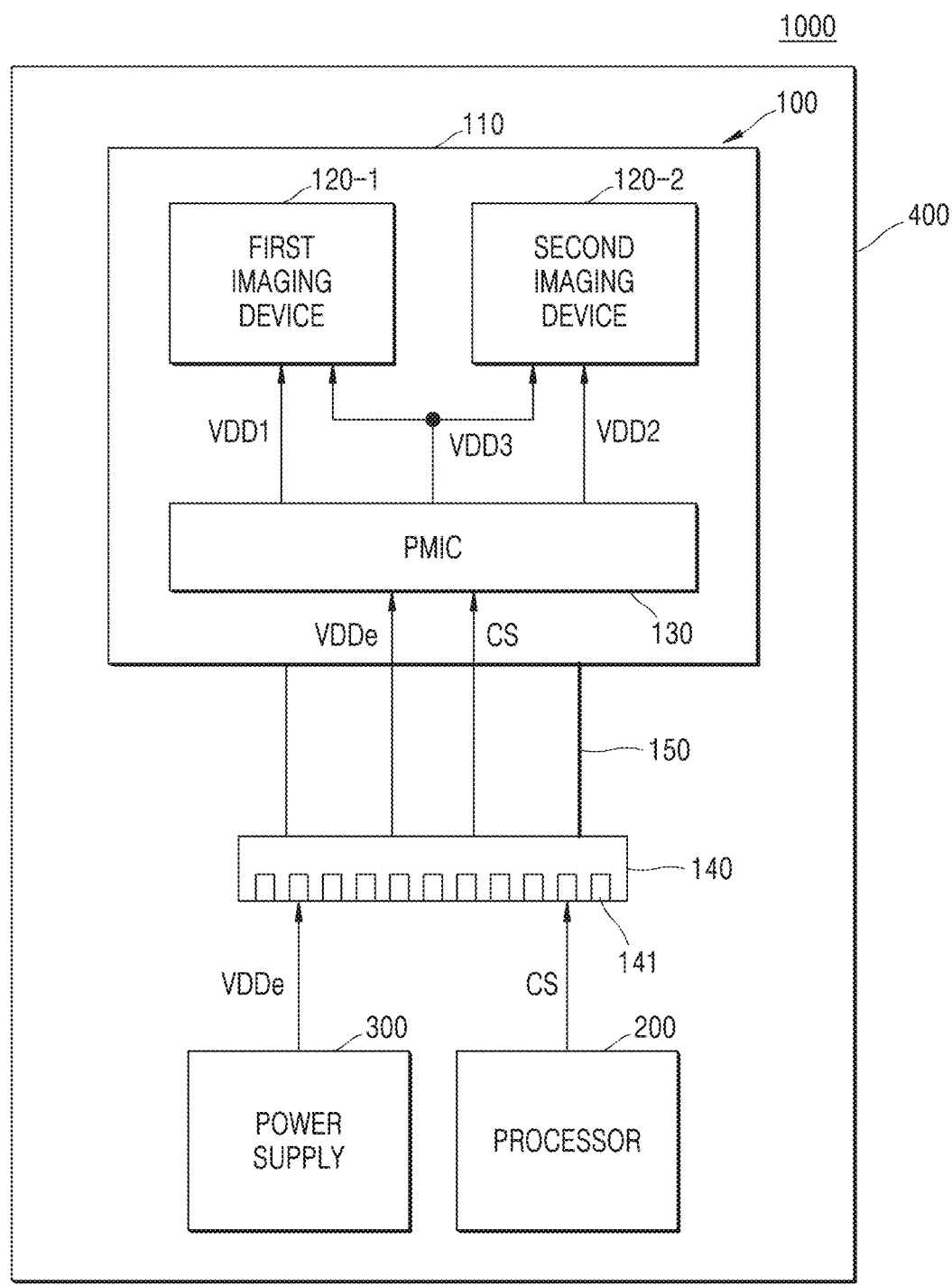
FIG. 7 is a block diagram schematically illustrating an imaging apparatus including a camera module according to an example embodiment of the inventive concepts.

FIG. 7 is a block diagram schematically illustrating an imaging apparatus 1000 including the camera module 100 according to an example embodiment of the inventive concepts.

Referring to FIG. 7, the imaging apparatus 1000 may include a camera module 100, a processor 200, and a power supply 300. The processor 200 and the power supply 300 may be mounted on a main board 400 of the imaging apparatus 1000. The camera module 100 may be mounted on the main board 400 or connected to the main board 400 through the connector 140.

The processor 200 may be any other processor configured to execute program instructions stored in a central processing device (CPU), a microprocessor, an ARM processor, an X86 processor, a microprocessor without interlocked pipeline stages (MIPS) processor, a graphics processing device (GPU), or a general purpose GPU.

The processor 200 may provide a control signal CS for controlling the camera module 100 to the camera module 100. The camera module 100 may receive instructions or commands for the control signal CS through the connector 140. For example, the control signal CS may include setting registers of the first imaging device 120-1, the second imaging device 120-2, and the PMIC 130, or an enable signal for controlling operations thereof, etc.

The power supply 300 may be a battery or a main PMIC of the imaging apparatus 1000. The power supply 300 may provide a power voltage output from the power supply 300, that is, the external power voltage VDDe, to the PMIC 130 through the connector 140.

The camera module 100 may be connected to other components of the imaging apparatus 1000. For example, the camera module 100 may be connected to the power supply 300 and the processor 200 through the connector 140, and may transmit and receive signals or voltages through the plurality of pins 141 of the connector 140.

Figure 8A:
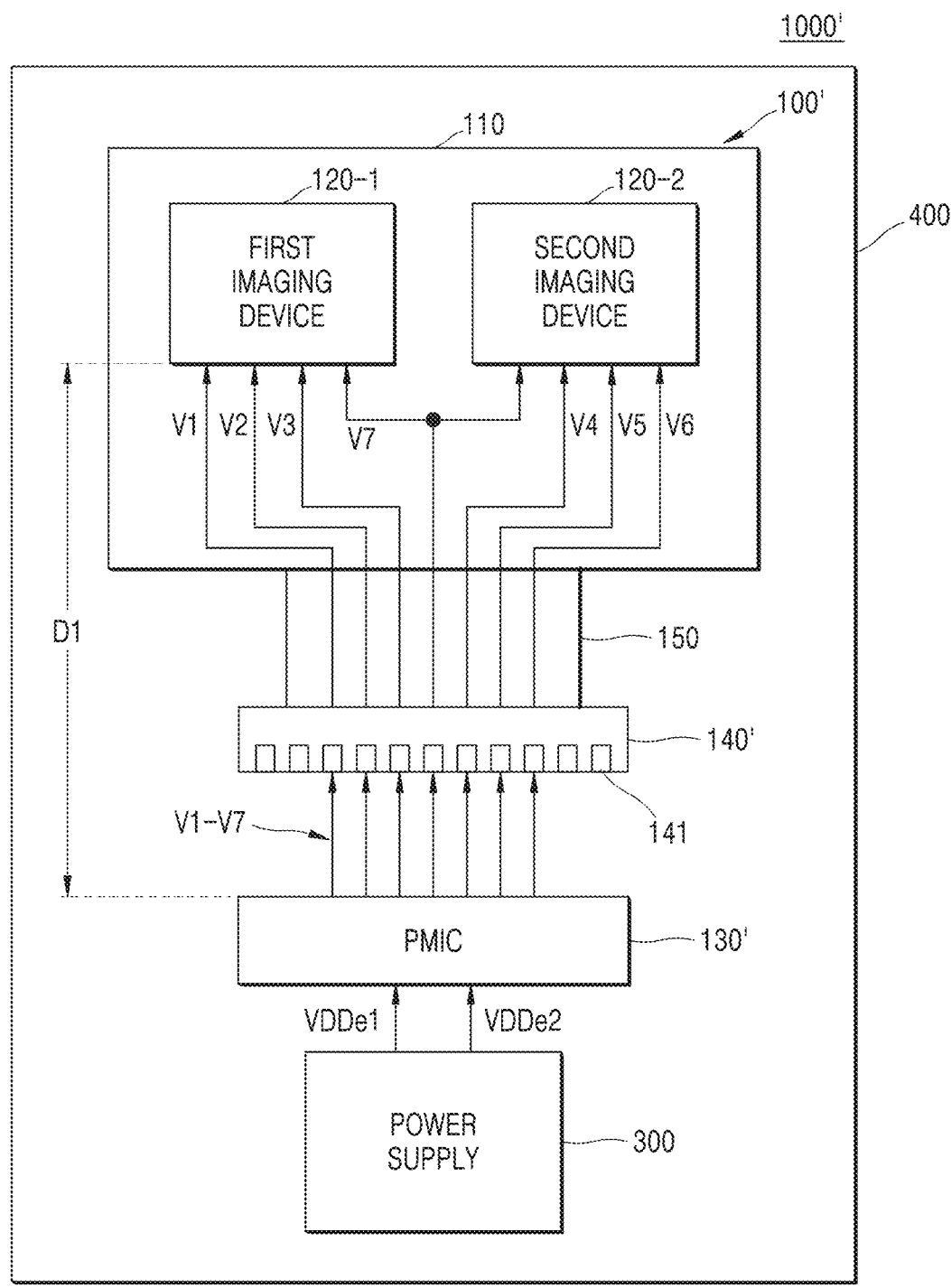
FIG. 8A is a block diagram illustrating an imaging apparatus including a camera module according to a comparative example.
Figure 8B:
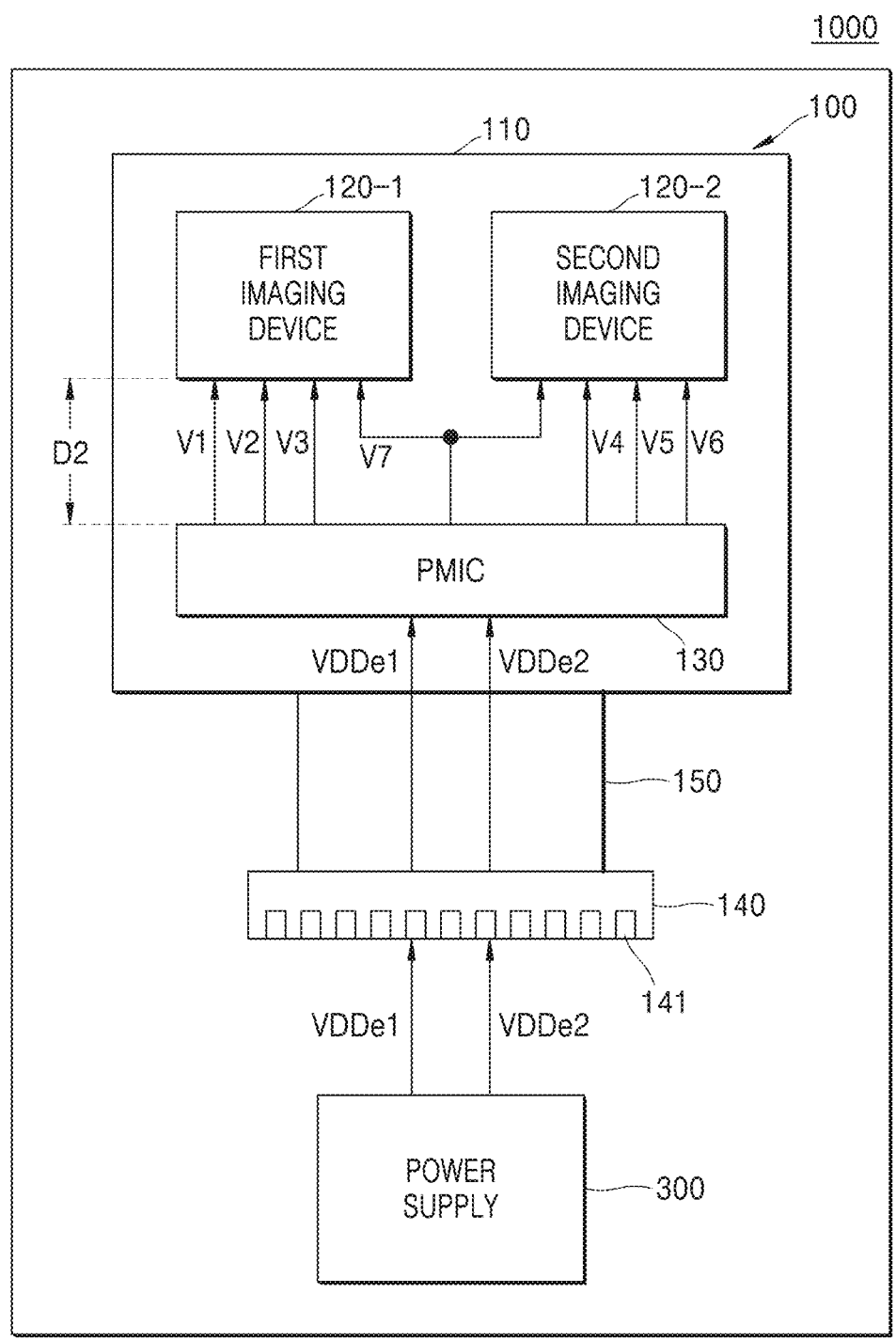
FIG. 8B is a block diagram illustrating an imaging apparatus including a camera module according to an example embodiment of the inventive concepts.

FIG. 8A is a block diagram illustrating an imaging apparatus 1000' including a camera module 100' according to a comparative example, and FIG. 8B is a block diagram illustrating the imaging apparatus 1000 including the camera module 100 according to an example embodiment of the inventive concept.

Referring to FIG. 8A, the camera module 100' according to the comparative example may include the first imaging device 120-1 and the second imaging device 120-2, and a PMIC 130' providing power voltages, for example, the voltages V1 to V7, to the camera module 100' may be mounted on the main board 400 of the imaging apparatus 1000'.

The PMIC 130' may generate the voltages V1 to V7 based on the external power voltages VDDe1 and VDDe2 provided from the power supply 300 and provide the voltages V1 to V7 to the first and second imaging devices 120-1 and 120-2 of the camera module 100' through the connector 140' of the camera module 100'. Accordingly, at least seven pins of the plurality of pins 141 of the connector 140' may transmit the voltages V1 to V7.

Referring to FIG. 8B, the camera module 100 according to an example embodiment may include the first imaging device 120-1, the second imaging device 120-2, and the PMIC 130. The PMIC 130 may receive the external power voltages VDDe1 and VDDe2 from the power supply 300 mounted on a main board 400 of the imaging apparatus 1000 through the connector 140, generate the voltages V1 to V7 based on the received external power voltages VDDe1 and VDDe2, and provide the voltages V1 to V7 to the first and second imaging devices 120-1 and 120-2. Accordingly, two of the plurality of pins 141 of the connector 140 may transmit the external power voltages VDDe1 and VDDe2. Therefore, the number of pins of connector of the camera module 100 according to an example embodiment may be reduced in comparison to the camera module 100' according to the comparative example.

Meanwhile, referring to FIGS. 8A and 8B, in the camera module 100, because the PMIC 130 is mounted in the camera module 100, the distance D2 between the first imaging device 120-1 and the second imaging device 120-2 and the PMIC 130 may be minimized or reduced. Thus, in the imaging apparatus 1000 to which the camera module 100 is attached, a distance D2 between the PMIC 130 and the first and the second imaging device 120-1 and 120-2 may be relatively shorter than a distance D1 between PMIC 130' and the first and the second imaging device 120-1 and 120-2 in the imaging apparatus 1000'. Accordingly, the relatively shorter distance D2 may minimize or reduce the noise in the transmitted voltages V1 to V7 to the first imaging device 120-1 and the second imaging device 120-2 and may minimize or reduce the I-R drop across the wire, and thus remove, reduce, or minimize the power noise.

In addition, in the imaging apparatus 1000' of FIG. 8A, passive elements may be connected to an output terminal side of the PMIC 130' to remove noise and stabilize the voltage levels of the voltages V1 to V7 output from the PMIC 130'. However, as described with reference to FIG. 4, in the camera module 100, the PMIC 130 may use passive elements of the first imaging device 120-1 and the second imaging device 120-2, thus, sharing the passive elements and reducing the number of the passive elements mounted on the imaging apparatus 1000.

Figure 9:
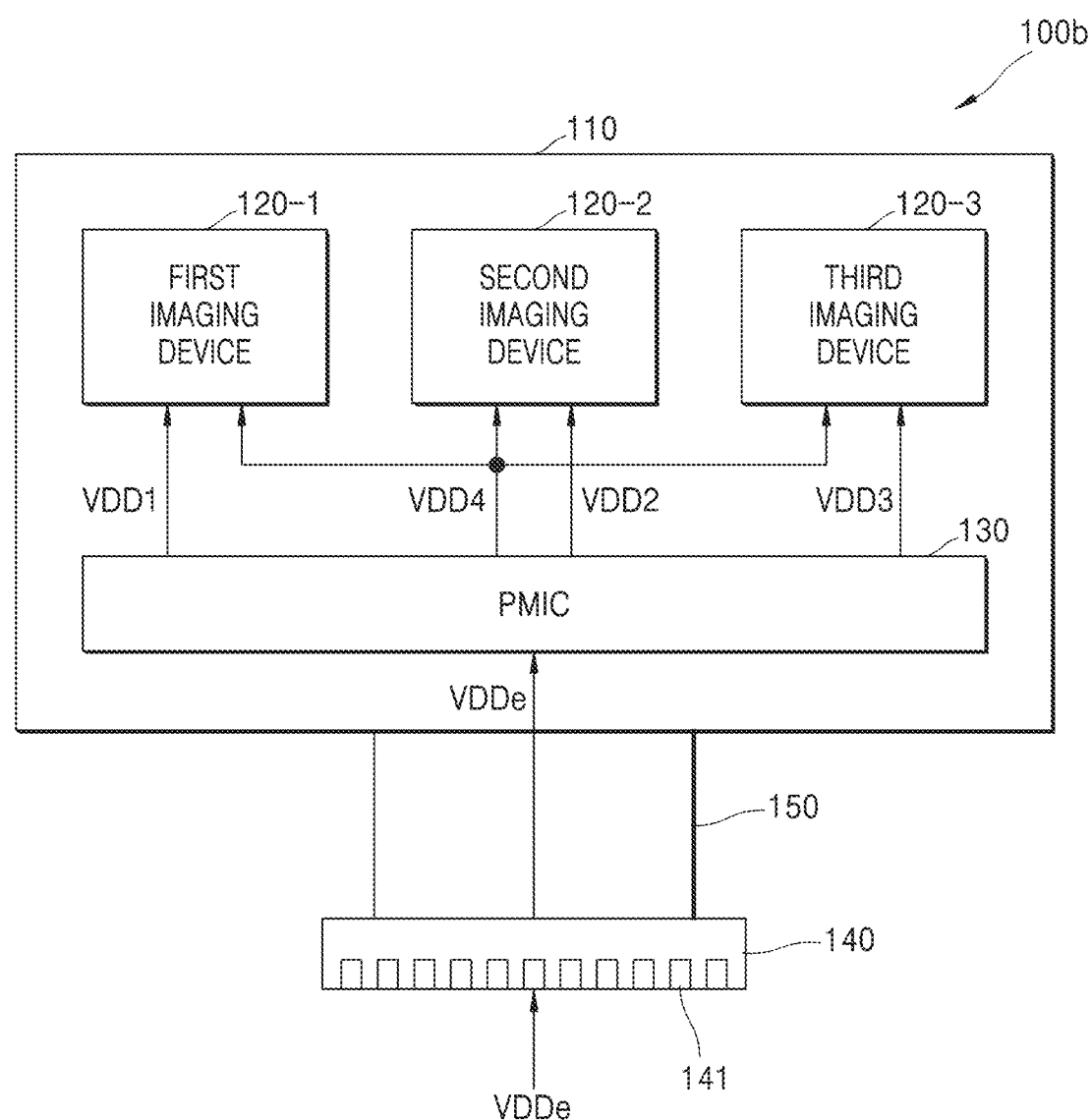
FIG. 9 is a block diagram schematically illustrating a camera module according to an example embodiment of the inventive concepts.

FIG. 9 is a block diagram schematically illustrating a camera module 100b according to an example embodiment.

Referring to FIG. 9, the camera module 100b may include the first imaging device 120-1, the second imaging device 120-2, a third imaging device 120-3, the PMIC 130, and the connector 140. The first imaging device 120-1, the second imaging device 120-2, the third imaging device 120-3, and the PMIC 130 may be on the PCB 110 and may transmit and receive signals or voltages to and from outside the camera module 100b through the connector 140. In an embodiment, the connector 140 may be connected to the PCB 110 through the FPCB 150.

The PMIC 130 may generate a plurality of power supply voltages VDD1, VDD2, VDD3, and VDD4 based on the external power voltage VDDe received from outside the camera module 100b through the connector 140 and provide the power voltages VDD1, VDD2, VDD3, and VDD4 to the first imaging device 120-1, the second imaging device 120-2, and the third imaging device 120-3.

Figure 10:
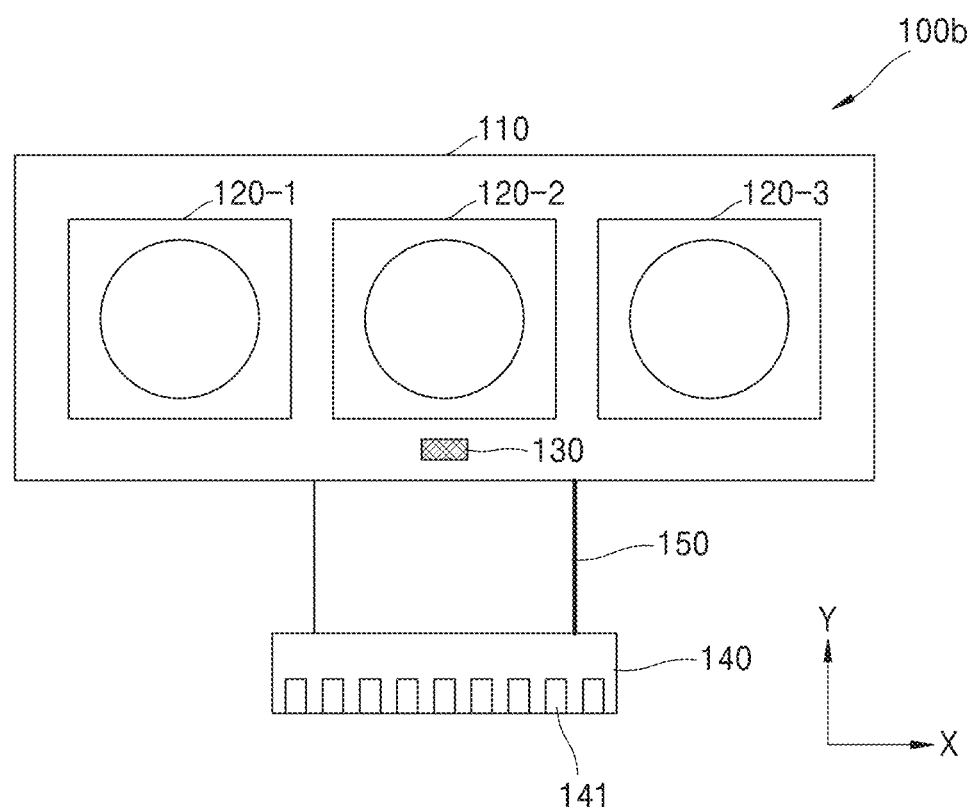
FIG. 10 is a diagram schematically illustrating a layout of a camera module according to an example embodiment of the inventive concepts.

FIG. 10 is a diagram schematically illustrating a layout of the camera module 100b according to the example embodiment of FIG. 9.

Referring to FIG. 10, the first imaging device 120-1, the second imaging device 120-2, and the third imaging device 120-3 may be arranged on the PCB 110 in parallel to a first direction (i.e. along an X-axis). The PMIC 130 may be between the connector 140 and the first, second, and third imaging devices 120-1 to 120-3 in a second direction (Y-axis direction) perpendicular to the first direction. In an embodiment, the PMIC 130 may be at a lower end of the second imaging device 120-2. Accordingly, the distance between the connector 140 and the PMIC 130 and the distance between the first, second, and third imaging devices 120-1 to 120-3 and the PMIC 130 may be minimized or reduced.

Figure 11:
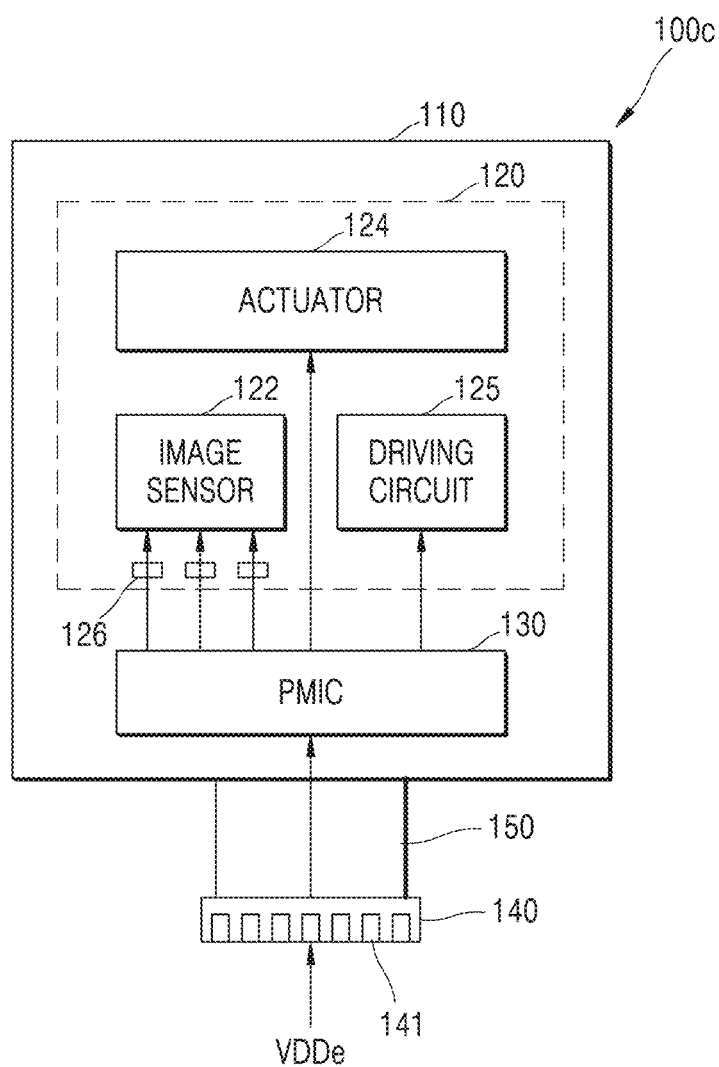
FIG. 11 is a block diagram schematically illustrating a camera module according to an example embodiment of the inventive concepts.

FIG. 11 is a block diagram schematically illustrating a camera module 100c according to an example embodiment.

Referring to FIG. 11, the camera module 100c may include an imaging device 120, the PMIC 130, and the connector 140. The imaging device 120 and the PMIC 130 may be on the PCB 110. The connector 140 may be connected to the PCB 110 directly or through the FPCB 150.

The camera module 100c may include an image sensor 122, an actuator 124, and a driving circuit 125, and the PMIC 130 may generate the power voltages for the actuator 124, the image sensor 122, and the driving circuit 125, based on the external power voltage VDDe received through the connector 140, and provide the voltages to the image sensor 122, the actuator 124, and the driving circuit 125.

Meanwhile, as described with reference to FIG. 4, the PMIC 130 may share a passive element with the imaging device 120. For example, an output terminal for outputting a voltage provided to the image sensor 122 among output terminals of the PMIC 130 may be connected to the passive element 126 connected to an input terminal of the image sensor 122. As a result, the passive element 126 connected to the input terminal of the image sensor 122 may stabilize the voltage level of the voltage provided to the image sensor 122 and removed or reduce the noise.

Figure 12A:
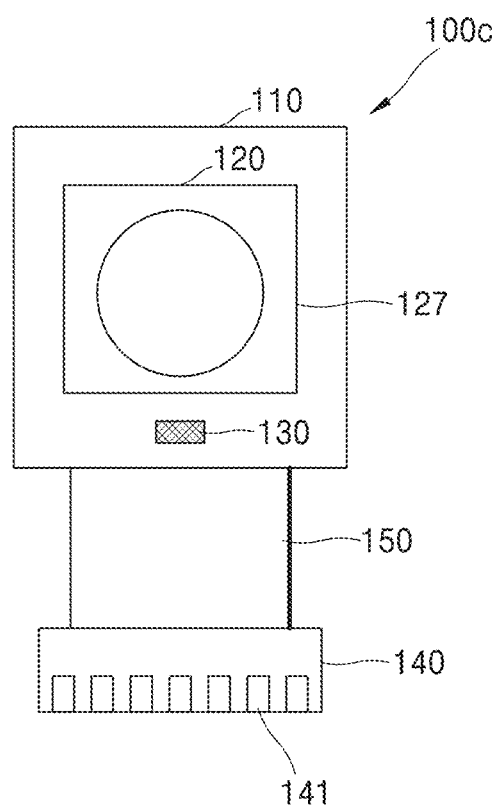
FIGS. 12A and 12B are block diagrams schematically illustrating a layout of a camera module according to an example embodiment of the inventive concepts.
Figure 12B:
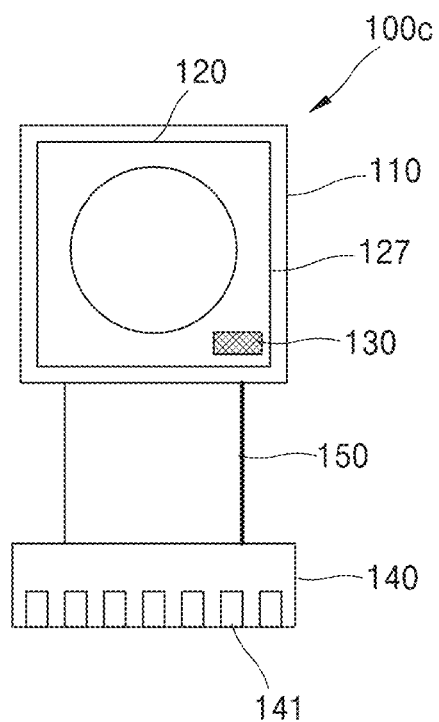

FIGS. 12A and 12B are diagrams schematically illustrating a layout of the camera module 100c according to the example embodiment of FIG. 11.

Referring to FIG. 12A, the PMIC 130 may be between the imaging device 120 and the connector 140 on the PCB 110. Alternatively, as shown in FIG. 12B, the PMIC 130 may be in the housing 127 of the imaging device 120.

Figure 13A:
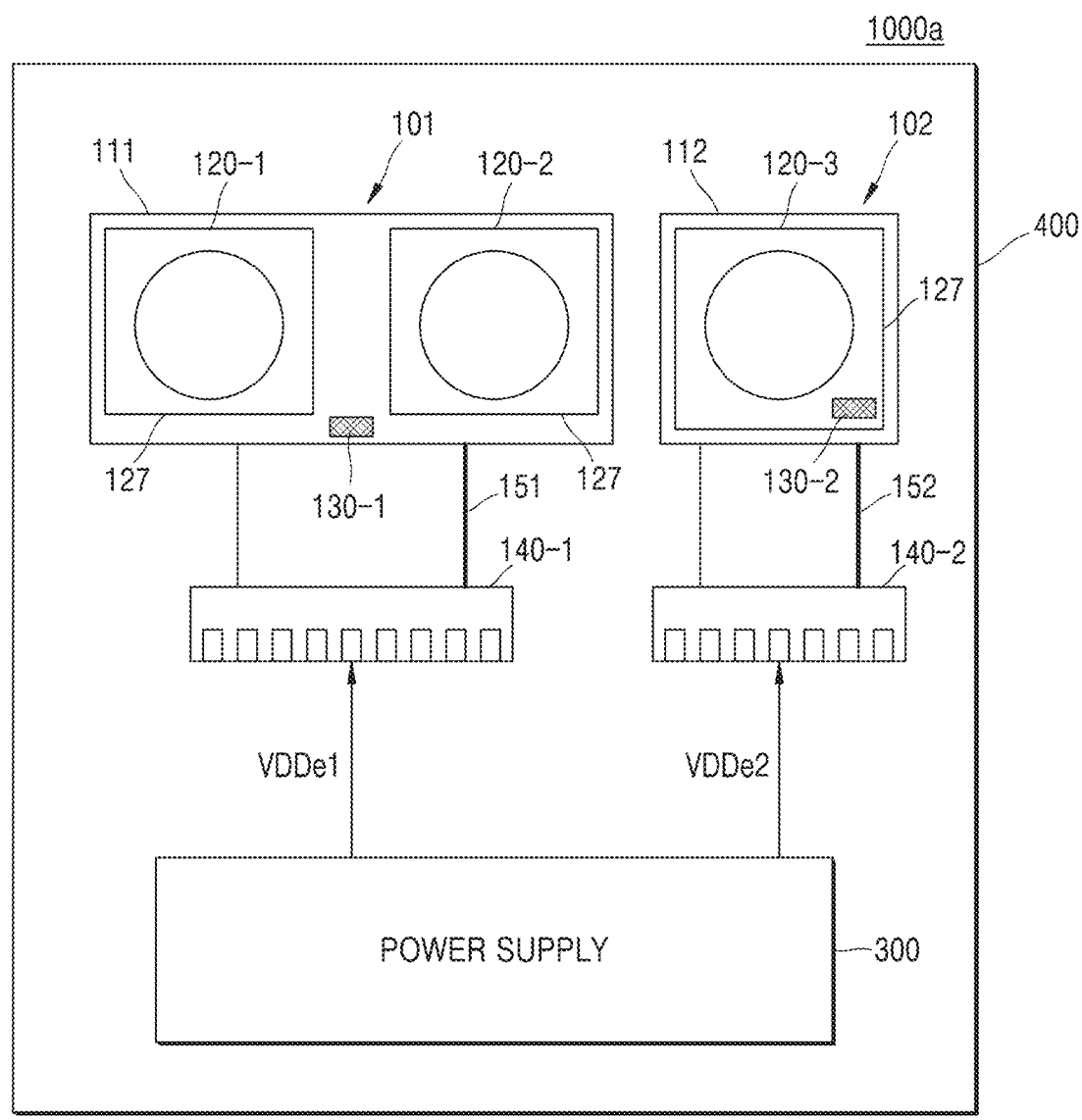
FIGS. 13A, 13B and 13C are block diagrams schematically illustrating imaging apparatuses including camera modules according to an example embodiment of the inventive concepts.
Figure 13B:
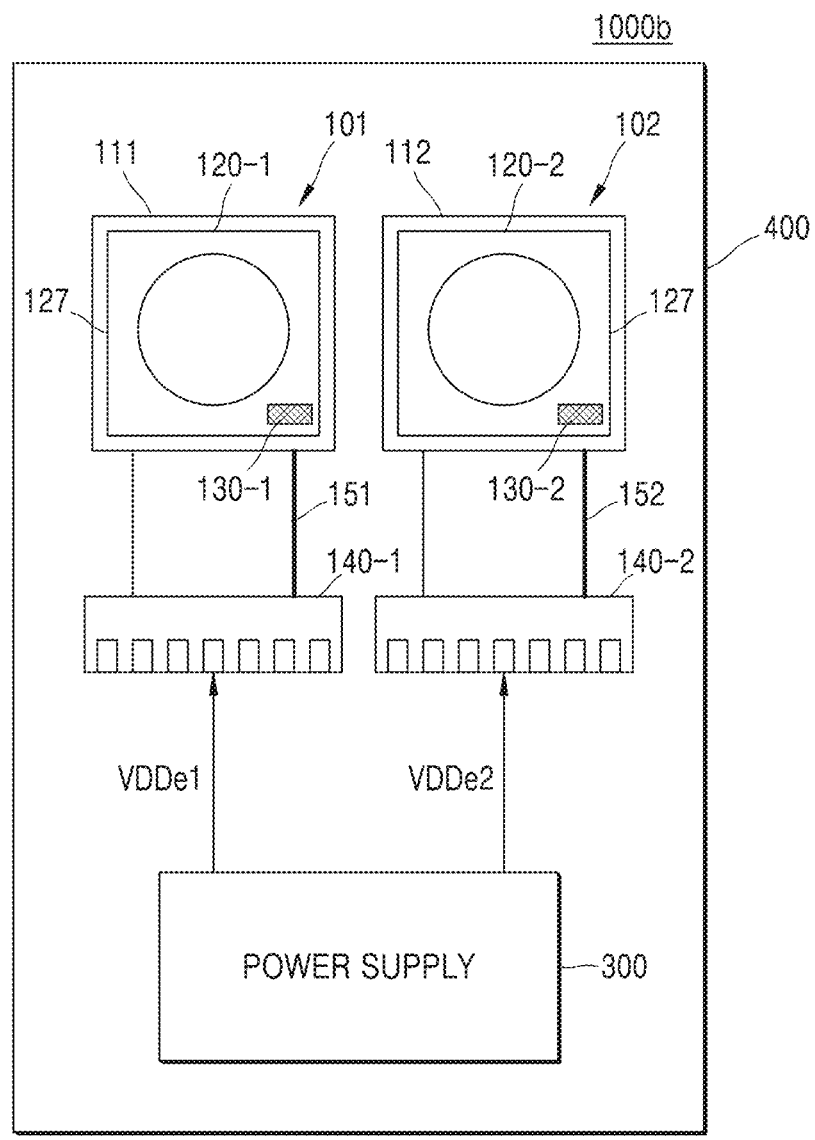
Figure 13C:
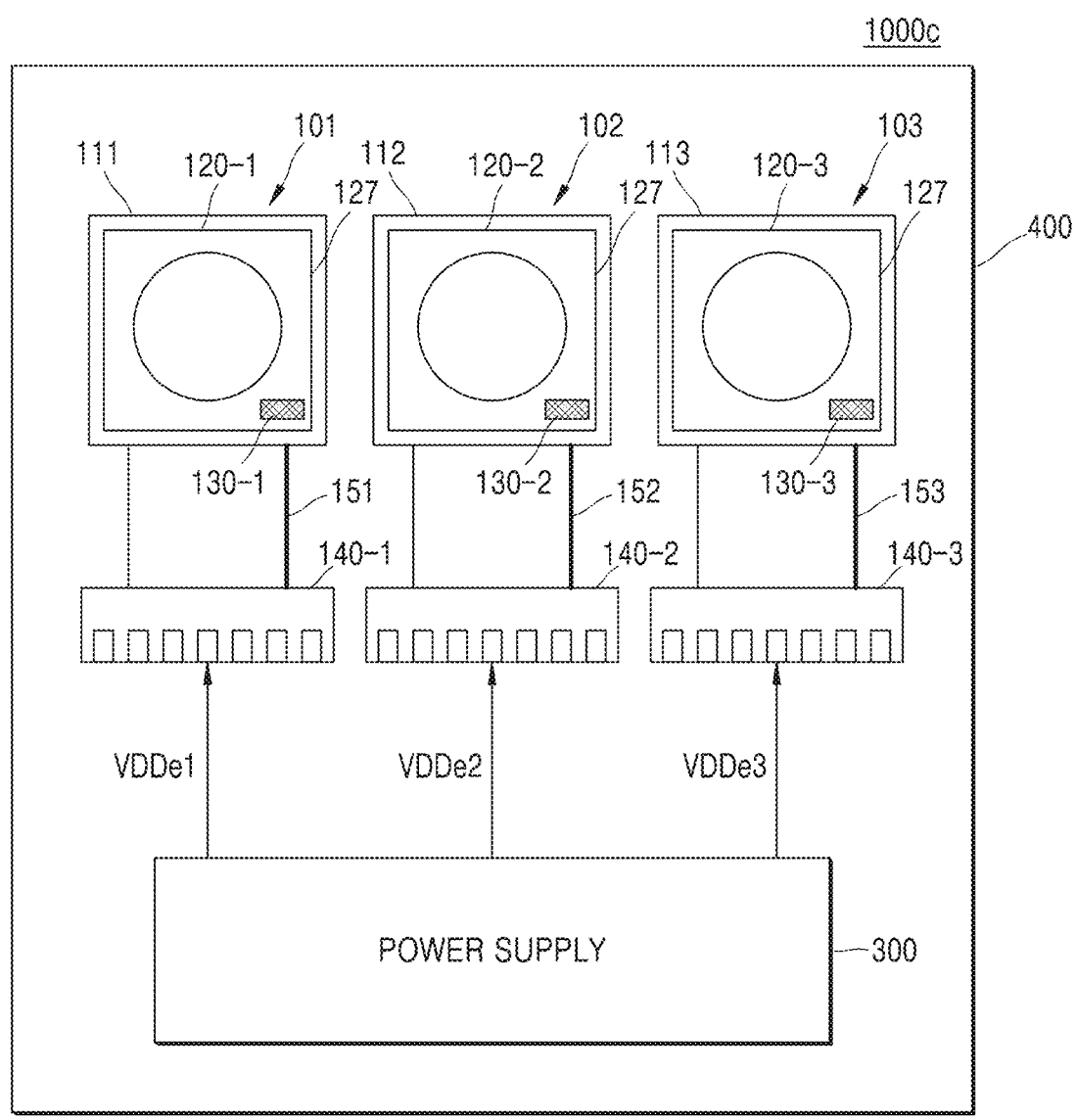

FIGS. 13A, 13B and 13C are block diagrams schematically illustrating imaging apparatuses 1000a, 1000b, and 1000c including camera modules 101, 102, and 103 according to an example embodiment of the inventive concepts. The imaging apparatuses 1000a, 1000b, and 1000c may include the plurality of camera modules 101, 102, and 103 including PMICs 130-1, 130-2, and 130-3.

Referring to FIG. 13A, the imaging apparatus 1000a may include the first camera module 101, the second camera module 102, and the power supply 300. The imaging apparatus 1000a may further include a processor configured to generate control signals for controlling the first camera module 101 and the second camera module 102.

The first camera module 101 may include a plurality of imaging devices, for example, the first imaging device 120-1 and the second imaging device 120-2, the first PMIC 130-1, and a first connector 140-1. The first imaging device 120-1, the second imaging device 120-2, and the first PMIC 130-1 may be on a first PCB 111. The first connector 140-1 may connect directly to the first PCB 111, through a FPCB 151, or through other means.

The second camera module 102 may include at least one imaging device, for example, the third imaging device 120-3, the second PMIC 130-2, and a second connector 140-2. The third imaging device 120-3 and the second PMIC 130-2 may be on a second PCB 112. The second connector 140-2 may be connected to the second PCB 112 through a FPCB 152 or directly. In an embodiment, the power consumption of at least one imaging device, for example, the third imaging device 120-3, may be relatively higher than that of the other imaging devices, for example the first imaging device 120-1 and the second imaging device 120-2, or may be relatively higher than the sum of the power consumption of the first imaging device 120-1 and the power consumption of the second imaging device 120-2.

The first camera module 101 and the second camera module 102 may be connected to the main board 400 of the imaging apparatus 1000a through the connectors 140-1 and 140-2, respectively. The power supply 300 may provide the first external power voltage VDDe1 to the first PMIC 130-1 of the first camera module 101 through the first connector 140-1, and provide the second external power voltage VDDe2 to the second PMIC 130-2 of the second camera module 102 through the second connector 140-2.

Referring to FIG. 13B, the imaging apparatus 1000b may include the first camera module 101, the second camera module 102, and the power supply 300.

The first camera module 101 may include the first imaging device 120-1, the first PMIC 130-1, and the first connector 140-1, and the second camera module 102 may include the second imaging device 120-2, the second PMIC 130-2, and the second connector 140-2. As such, each of the first camera module 101 and the second camera module 102 may include one imaging device, and a PMIC may be mounted on a camera module.

In an embodiment, the first camera module 101 and the second camera module 102 may operate in synchronization with each other. For example, a synchronization signal SYNC may be transmitted and received between the first camera module 101 and the second camera module 102 through the connectors 140-1 and 140-2, and the first PMIC 130-1 and the second PMIC 130-2 may generate power voltages based on an operation time according to the synchronization signal SYNC. For example, the first PMIC 130-1 in the first camera module 101 may provide the synchronization signal SYNC to the second PMIC 130-2 in the second camera module 102, and the second PMIC 130-2 may generate power voltages for the second imaging device 120-2 based on the synchronization signal SYNC. For example, the synchronization signal SYNC may include a timing signal, an on/off signal of a camera module, and the like.

Referring to FIG. 13C, the imaging apparatus 1000c may include the first camera module 101, the second camera module 102, and the third camera module 103. Each of the first camera module 101, the second camera module 102, and the third camera module 103 may include one of the imaging devices 120-1, 120-2, and 120-3 and one of the PMICs 130-1, 130-2, and 130-3. The PMICs 130-1, 130-2, and 130-3 respectively provided in the first camera module 101, the second camera module 102, and the third camera module 103 may generate power voltages VDD1, VDD2, and VDD3 based on the external power voltages VDDe1, VDDe2, and VDDe3 received from the power supply 300 through the connectors 140-1, 140-2, and 140-3, respectively, and provide the power voltages VDD1, VDD2, and VDD3 to the imaging devices 120-1, 120-2, and 120-3.

In an embodiment, similarly to the description provided with reference to FIG. 13B, the first camera module 101, the second camera module 102, and the third camera module 103 may operate in synchronization with each other. For example, the synchronization signal SYNC may be transmitted and received between the first camera module 101, the second camera module 102, and the third camera module 103 through the connectors 140-1, 140-2, and 140-3, and the PMICs 130-1, 130-2, and 130-3 may generate power voltages based on an operation time according to the synchronization signal SYNC.

Figure 14:
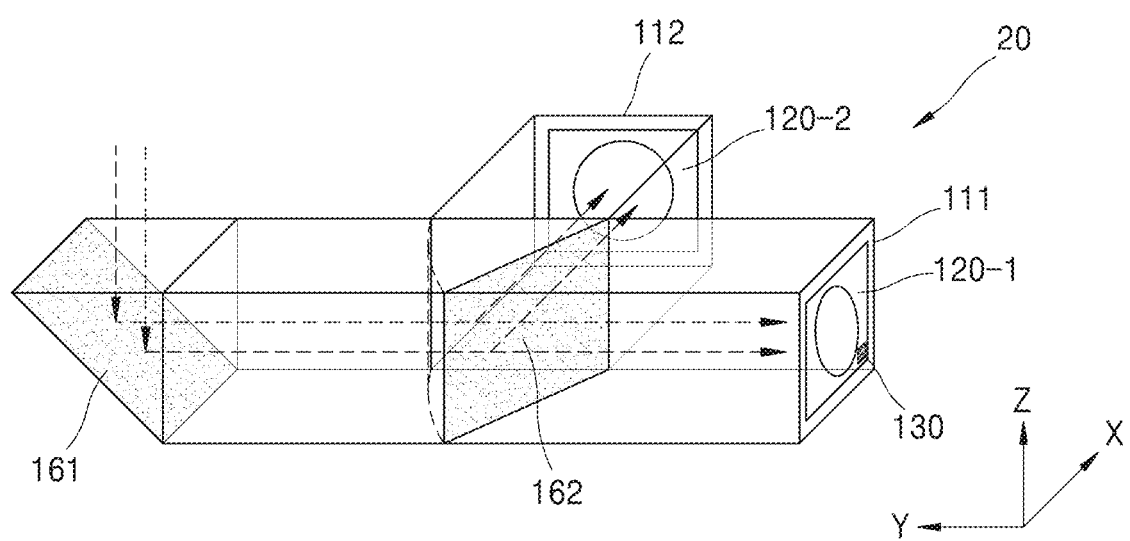
FIG. 14 schematically illustrates a camera module with a folded structure using a refraction device according to an example embodiment of the inventive concepts.

FIG. 14 schematically illustrates a camera module 20 with a folded structure using a refraction device according to the example embodiment of the inventive concepts.

Referring to FIG. 14, the camera module 20 may include the first imaging device 120-1, the second imaging device 120-2, the PMIC 130, a first refraction device 161, and a second refraction device 162. The first refraction device 161 and the second refraction device 162 may include a prism, a mirror, a beam splitter, etc.

The first refraction device 161 may refract (or reflect) an optical signal received from outside the camera module 20 in a direction (e.g., a Y-axis direction) in which the first imaging device 120-1 is positioned. The second refraction device 162 may refract the refracted optical signal in a direction (e.g., an X-axis direction) in which the second imaging device 120-2 is positioned to transmit the optical signal in the direction of the first imaging device 120-1.

The first imaging device 120-1 may be mounted on the first PCB 111, and the second imaging device 120-2 may be mounted on the second PCB 112. The PMIC 130 may be mounted on at least one of the first PCB 111 and the second PCB 112. A connector may be connected to at least one of the first PCB 111 and the second PCB 112. In an embodiment, the first PCB 111 and the second PCB 112 may be connected through a FPCB.

Figure 15A:
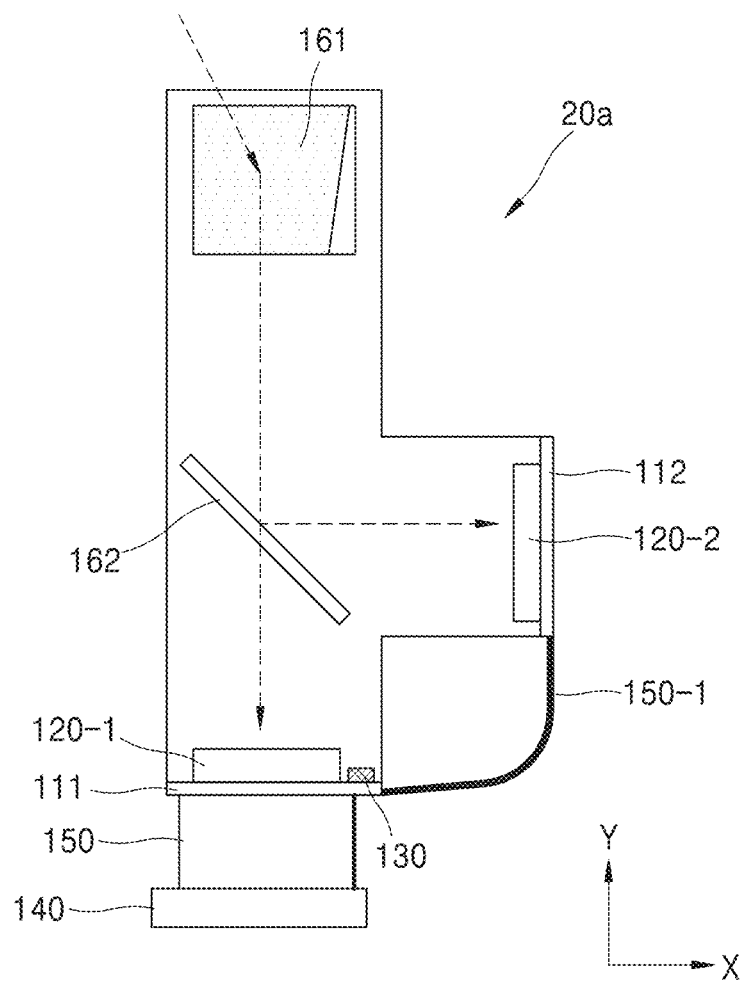
FIGS. 15A and 15B schematically illustrate cross-sectional views of a camera module according to an example embodiment of the inventive concepts.
Figure 15B:
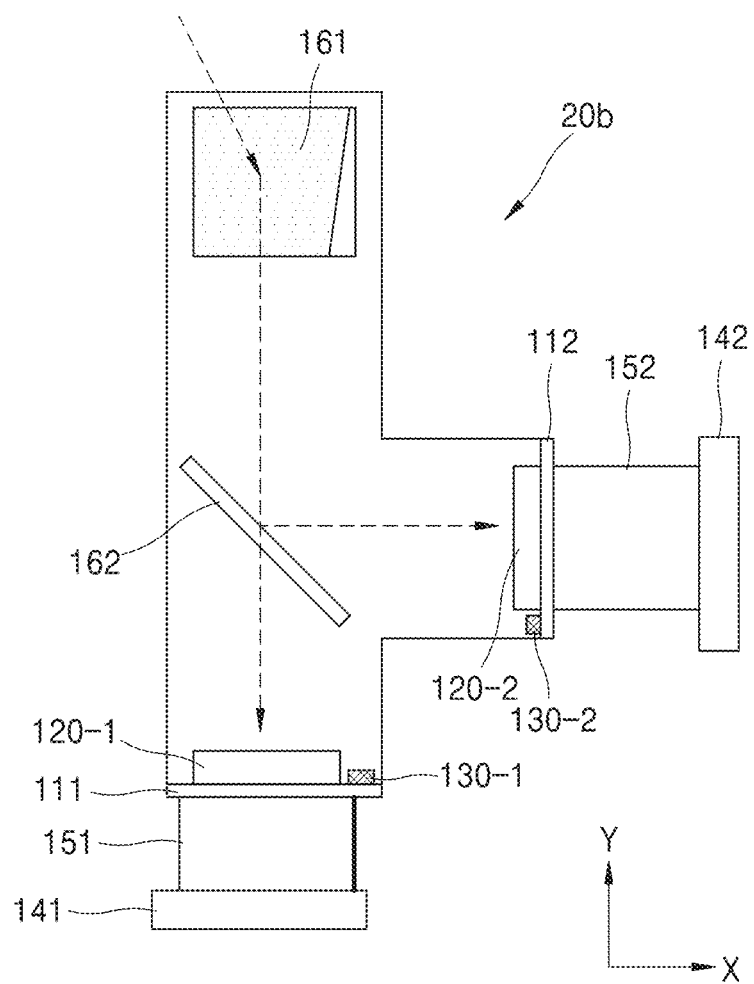

FIGS. 15A and 15B schematically illustrate cross-sectional views of a camera module according to an example embodiment of the inventive concepts. FIGS. 15A and 15B are cross-sectional views of the camera module 20 of FIG. 14 viewed in a third direction (a Z-axis direction).

Referring to FIG. 15A, in a camera module 20a, the connector 140 may be connected to the first PCB 111 directly or through the FPCB 150, and the PMIC 130 may be mounted on the first PCB 111. The first PCB 111 and the second PCB 112 may be connected through a FPCB 150-1.

The PMIC 130 may generate power voltages VDD1 and VDD2 for the first imaging device 120-1 and the second imaging device 120-2 using an external power voltage VDDe1 and VDDe2 received from the outside through the connector 140. The PMIC 130 may provide a power voltage VDD1 to the first imaging device 120-1 through wiring lines patterned on the first PCB 111 and provide a power voltage VDD2 to the second imaging device 120-2 through wiring lines patterned on the FPCB 150-1 and the second PCB 112.

Referring to FIG. 15B, in a camera module 20b, the first connector 141 and the second connector 142 may be respectively connected to the first PCB 111 and the second PCB 112 directly or through the FPCBs 151 and 152. The first imaging device 120-1 and the first PMIC 130-1 may be mounted on the first PCB 111, and the second imaging device 120-1 and the second PMIC 130-2 may be mounted on the second PCB 112.

The first PMIC 130-1 may generate power voltages VDD1 for the first imaging device 120-1 based on an external power voltage VDDe received from the outside through the first connector 140-1. The second PMIC 130-2 may generate power voltages VDD2 for the second imaging device 120-2 based on an external power voltage received from the outside through the second connector 140-2.

Figure 16B:
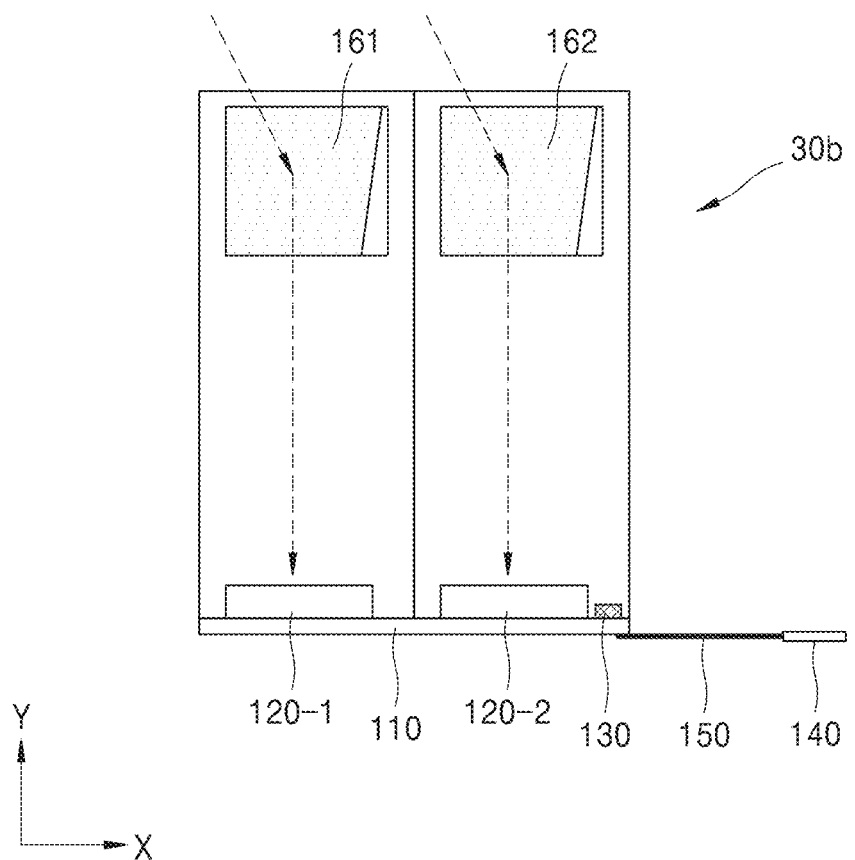

FIGS. 16A and 16B schematically illustrate a camera module according to an example embodiment of the inventive concepts.

Referring to FIG. 16A, the camera module 30a may include the first imaging device 120-1, the second imaging device 120-2, the PMIC 130, the connector 140, the first refraction device 161, and the second refraction device 162.

The first imaging device 120-1, the second imaging device 120-2, and the PMIC 130 may be mounted on the PCB 110. The connector 140 may be connected to the PCB 110 through the FPCB 150. The PMIC 130 may be between the first imaging device 120-1 and the second imaging device 120-2 on the PCB 110.

The first refraction device 161 and the second refraction device 162 may refract received light in a direction in which the first imaging device 120-1 and the second imaging device 120-2 are positioned, for example, in the Y-axis direction. The first imaging device 120-1 and the second imaging device 120-2 may receive optical signals through the refraction of the light by the first refraction device 161 and the second refraction device 162 and respectively generate images based on the optical signals.

Referring to FIG. 16B, in a camera module 30b, the connector 140 may be connected to one side of the PCB 110. The PMIC 130 may be in an area close to the connector 140 on the PCB 110.

Figure 17:
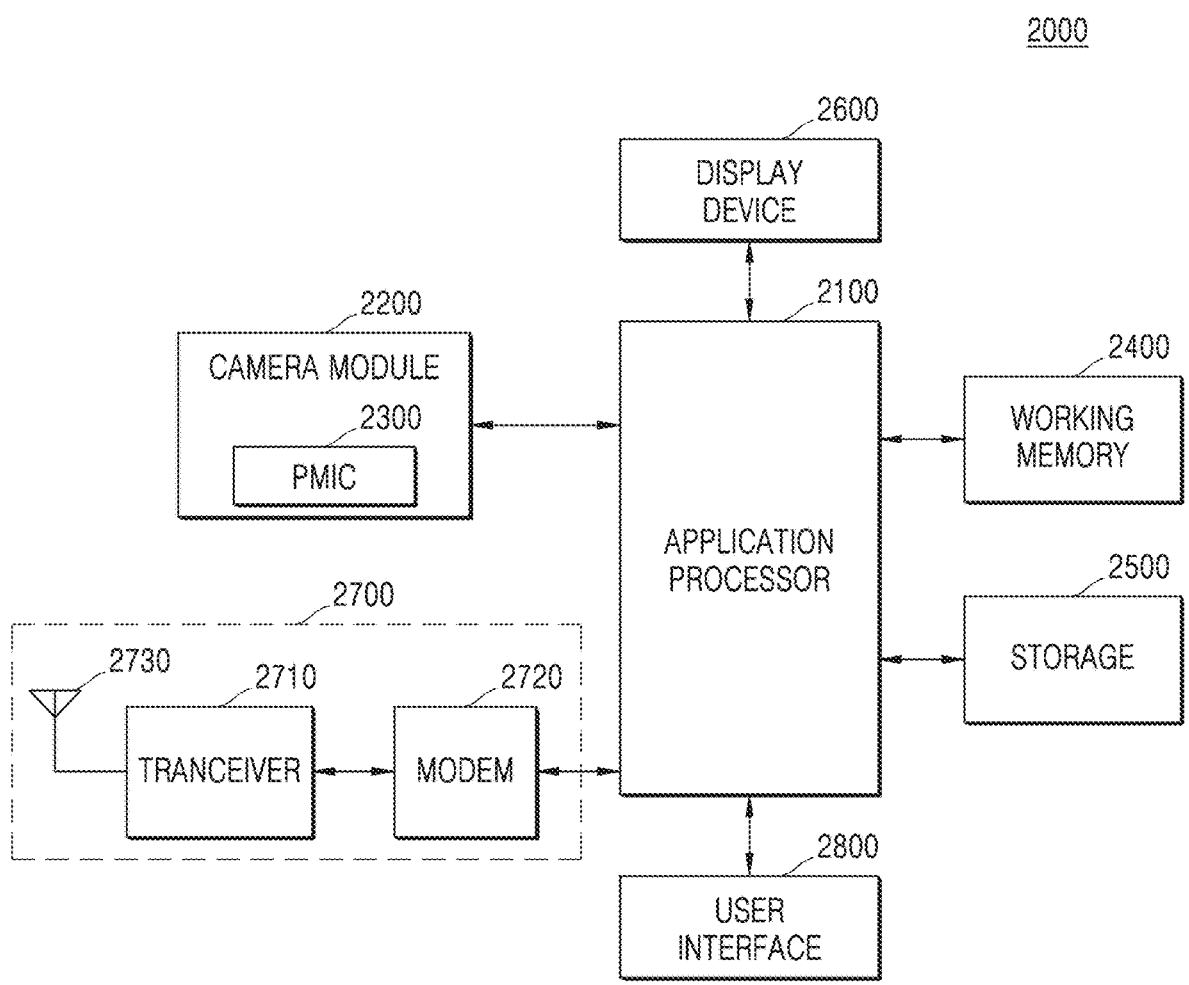
FIG. 17 is a block diagram illustrating a portable terminal including a camera module according to an example embodiment of the inventive concepts.

FIG. 17 is a block diagram illustrating a portable terminal including a camera module according to an example embodiment of the inventive concepts.

Referring to FIG. 17, the portable terminal 2000 may include an application processor 2100, a camera module 2200, a working memory 2400, a storage 2500, a display device 2600, a wired/wireless transceiver 2700, and a user interface 2800. The portable terminal 2000 may further include other components for provided functions, for example, an audio sensor device, etc.

The application processor 2100 may control the overall operation of the portable terminal 2000 and may include a system on chip (SoC) for driving an application program, an operating system, etc. The application processor 2100 may control the camera module 2200, generate control signals for controlling the camera module 2200 and provide the control signals to the camera module 2200 through a connector of the camera module 2200.

The camera module according to the various embodiments described above may be applied as the camera module 2200. The camera module 2200 may include a PMIC 2300. The PMIC 2300 may be mounted on a PCB together with one or more imaging devices, and may generate power voltages VDD used in the camera module 2200 based on an external power voltage VDDe received through a connector.

The working memory 2400 may include a volatile memory such as dynamic random access memory (DRAM), static RAM (SRMA), etc. or a nonvolatile resistive memory such as ferroelectric RAM (FeRAM), resistive RAM (RRAM), phase-change RAM (PRAM), etc. The working memory 2400 may store programs and/or data processed or executed by the application processor 2100.

The storage 2500 may include a nonvolatile memory device such as NADN flash, resistive memory, etc. For example, the storage 2500 may be provided as a memory card such as a multi-media card (MMC), an embedded MMC (eMMC), a secure digital (SD) card, etc. The storage 2500 may store an image received from the application processor 2100 or the camera module 2200. In addition, the storage 2500 may store data and/or a program for an execution algorithm that implements functions of the application processor 2100. When the application processor 2100 operates, the data and/or the program may be loaded onto the working memory 2400 upon operation of the application processor 2100.

The display device 2600 may include one of a liquid crystal display (LCD), a light emitting diode (LED) display, an organic LED (OLED) display, an active-matrix OLED (AMOLED) display, an electrochromic display (ECD), a digital mirror device (DMD) display, an actuated mirror device (AMD), a grating light valve (GLV) display, a plasma display panel (PDP) display, an electro luminescent display (ELD), a vacuum fluorescent display (VFD), or any other type of flat panel or flexible panel. The display device 2600 may receive an image from the application processor 2100 or the camera module 2200 and display the received image.

The wireless transceiver 2700 may include a transceiver 2710, a modem 2720, and an antenna 2730. The wireless transceiver 2700 may communicate with an external device.

The user interface 2800 may include various devices capable of receiving user input, such as a keyboard, a key panel, a touch panel, a fingerprint sensor, a microphone, etc. The user interface 2800 may receive the user input and provide a signal corresponding to the received user input to the application processor 2100.

While the inventive concepts have been particularly shown and described, it will be understood that various changes in form and details may be made therein without departing from the spirit and scope of the following claims.

What is claimed is:

1. A camera module comprising:
a printed circuit board (PCB);
a first imaging device on the PCB, the first imaging device configured to generate first image data based on a received optical signal;
a second imaging device on the PCB, the second imaging device configured to generate second image data based on the received optical signal;
a power management integrated circuit (PMIC) on the PCB, the PMIC configured to generate a plurality of power voltages based on an external power voltage received from an external power supply, the plurality of power voltages including a first power voltage and a second power voltage, and the PMIC configured to provide at least the first power voltage to the first imaging device through at least one first wiring line patterned directly connecting the PMIC and the first imaging device on the PCB and the second power voltage to the second imaging device through at least one second wiring line patterned directly connecting the PMIC and the second imaging device on the PCB;
a capacitor connected to at least one output terminal of the PMIC and at least input terminal of an image sensor included in the first imaging device, the capacitor being shared with the PMIC and the first imaging device; and
a connector configured to receive the external power voltage from the external power supply and provide the external power voltage to the PMIC through at least one third wiring line patterned on the PCB.

2. The camera module of claim 1, wherein
the first imaging device comprises a first lens and a first image sensor, the first lens configured to collect an optical signal, and the first image sensor configured to convert the optical signal to a first image signal, and
the second imaging device comprises a second lens and a second image sensor, the second lens configured to collect the optical signal and the second image sensor configured to convert the optical signal to a second image signal.

3. The camera module of claim 1, wherein
the PMIC comprises a first voltage generator and a second voltage generator;
the first voltage generator configured to provide the first power voltage to the first imaging device; and
the second voltage generator configured to provide the second power voltage to the second imaging device,
wherein the first voltage generator and the second voltage generator are activated or deactivated in response to an enable signal received through the connector.

4. The camera module of claim 1, wherein the first imaging device and the second imaging device are in parallel to a first direction on the PCB, and the PMIC is between the connector and the first and second imaging devices.

5. The camera module of claim 1, wherein the PMIC is in a housing of the first imaging device or the second imaging device.

6. The camera module of claim 1, wherein the connector is adjacent to the first imaging device, and the PMIC is between the first imaging device and the connector.

7. The camera module of claim 1, wherein image characteristics of the first image data and the second image data are different.

8. The camera module of claim 1, further comprising
a third imaging device on the PCB, the third imaging device configured to generate a third image signal based on the received optical signal,
wherein the plurality of power voltages comprise a fourth power voltage provided to the third imaging device.

9. The camera module of claim 1, further comprising a refraction device configured to redirect the received optical signal towards the first imaging device and the second imaging device.

10. The camera module of claim 2, wherein
the first imaging device further comprises an actuator coupled to the first lens to move the first lens; and
a driving circuit configured to control the actuator.

11. A camera module comprising:
a first imaging device mounted on a first printed circuit board (PCB), the first imaging device configured to generate first image signals based on a received optical signal;
a second imaging device configured to generate second image signals based on the received optical signal;
a first refraction device in front of the first imaging device and configured to redirect the received optical signal from a first optical path to a different optical path and towards an opening of the first imaging device;
a power management integrated circuit (PMIC) mounted on the first PCB, the PMIC configured to provide a first power voltage to the first imaging device through at least one first wiring line patterned on the PCB, the at least one first wiring line including a direct connection between the PMIC and the first imaging device;

a capacitor connected to at least one output terminal of the PMIC and at least input terminal of an image sensor included in the first imaging device, the capacitor being shared with the PMIC and the first imaging device; and a connector configured to receive a power voltage and provide the power voltage to the PMIC through at least one second wiring line patterned on the PCB.

12. The camera module of claim 11, wherein
the PMIC comprises a plurality of output terminals, the plurality of output terminals including a first output terminal, and
the first imaging device comprises the capacitor,
wherein the first output terminal of the plurality of output terminals is configured to output the first power voltage provided to the first imaging device.

13. The camera module of claim 11, wherein
the second imaging device is mounted on a second PCB connected to the first PCB through a connecting member, and
the PMIC is configured to provide a second voltage the second imaging device.

14. The camera module of claim 11, further comprising
a second refraction device configured to redirect the received optical signal redirected by the first refraction device toward an opening of the second imaging device.

15. An imaging apparatus comprising:
a first camera module comprising at least one first camera assembly, and a first PMIC on a first printed circuit board (PCB), and a connector electrically connected to the PCB and including a plurality of pins,
the at least one first camera assembly configured to generate image data, and
the first PMIC configured to generate a plurality of power voltages based on a power voltage received through the connector and to provide the plurality of power voltages to the at least one first camera assembly through at least one first wiring line patterned on the PCB, the at least one first wiring line including a direct connection between the PMIC and the at least one first camera assembly;

a power supply configured to provide the power voltage to the first camera module through at least one first pin of the plurality of pins of the connector; and a processor configured to provide a control signal to the first camera module through at least one second pin of the plurality of pins of the connector,
wherein the first PMIC is configured to share a capacitor with an image sensor included in at least one first camera assembly, the capacitor being connected to at least one output terminal of the PMIC and at least input terminal of the image sensor.

16. The imaging apparatus of claim 15, further comprising
a second camera module comprising at least one second camera assembly and a second PMIC,
the second PMIC configured to provide a plurality of voltages to the at least one second camera assembly.

* * * * *